(12) United States Patent
Vela

(10) Patent No.: US 12,735,757 B2
(45) Date of Patent: Sep. 15, 2026

(54) SYSTEM FOR THE REMOVAL OF WATER VAPOR FROM MOLASSES OR OTHER HIGH SUGAR CONCENTRATE SUBSTANCES AND METHOD FOR OPERATING SAME

(71) Applicant: John Vela, Victoria, TX (US)

(72) Inventor: John Vela, Victoria, TX (US)

( * ) Notice: Subject to any disclaimer, the term of this patent is extended or adjusted under 35 U.S.C. 154(b) by 116 days.

(21) Appl. No.: 18/404,767

(22) Filed: Jan. 4, 2024

(65) Prior Publication Data

US 2024/0218470 A1 Jul. 4, 2024

Related U.S. Application Data

(60) Provisional application No. 63/478,365, filed on Jan. 4, 2023.

(51) Int. Cl.
*C13B 25/06* (2011.01)
*B01D 1/00* (2006.01)
*C13B 25/00* (2011.01)
*C13B 25/02* (2011.01)

(52) U.S. Cl.
CPC ............ *C13B 25/06* (2013.01); *B01D 1/0064* (2013.01); *C13B 25/001* (2013.01); *C13B 25/02* (2013.01)

(58) Field of Classification Search
CPC ....... C13B 25/06; C13B 25/001; C13B 25/02; C13B 25/04; B01D 1/0064; B01D 1/0082; B01D 3/10; B01D 3/106; C02F 1/046
See application file for complete search history.

(56) References Cited

U.S. PATENT DOCUMENTS

| | | | |
|---|---|---|---|
| 9,155,325 | B2 | 10/2015 | Rapstine |
| 2004/0253560 | A1 | 12/2004 | Markwardt et al. |
| 2018/0187275 | A1 | 7/2018 | Koenig et al. |

FOREIGN PATENT DOCUMENTS

| | | | |
|---|---|---|---|
| EP | 0244079 | A2 | 11/1987 |
| EP | 0737753 | A2 | 10/1996 |

*Primary Examiner* — Renee Robinson

(74) *Attorney, Agent, or Firm* — Miguel Villarreal, Jr.; Gunn, Lee & Cave, P.C.

(57) ABSTRACT

A system composed of heating and vacuum elements for the purpose of removing water vapor from molasses or other high sugar concentrate substances. Alternatively, the system could be used to remove water vapor from any substance where water removal is desired. Typically, the system starts with a molasses or high sugar concentrate with a moisture content of up to 40 percent. After processing, the system produces a high sugar concentrate with a moisture content of less than 5 percent. The system uses a continuous flow vacuum evaporated process. In an alternative embodiment, a method of operating the system is also disclosed.

6 Claims, 20 Drawing Sheets

12
46
42
44
28
48
102
30
14

100
98
95
10
96
94

182
246
182
240
242
248
246
182
240
242
242
244
242
240
238
182
242
244
250

SYSTEM FOR THE REMOVAL OF WATER VAPOR FROM MOLASSES OR OTHER HIGH SUGAR CONCENTRATE SUBSTANCES AND METHOD FOR OPERATING SAME

CROSS-REFERENCES TO RELATED APPLICATIONS

This original non-provisional application claims priority to and the benefit of U.S. provisional application Ser. No. 63/478,365, filed Jan. 4, 2023, entitled "System for the Removal of Water Vapor from Molasses or other High Sugar Concentrate Substances and Method for Operating Same," which is incorporated by reference herein.

STATEMENT REGARDING FEDERALLY-SPONSORED RESEARCH OR DEVELOPMENT

Not applicable.

BACKGROUND

1. Field of the Invention

The present invention relates to removal of water vapor from substances. More specifically, the invention relates to a system for the removal of water vapor from molasses or other high sugar substances and a method for operating same.

2. Description of the Related Art

There exists in the art systems for removing water vapor from molasses and other high sugar substances. However, such existing water vapor removal systems use an open flame gas fired heat source. A natural gas fired system is basically like cooking in an oven which relies on convection as the heat transfer method. A purely convective system is less productive than that of a steam heat transfer system because the steam system transfers its latent heat to the lower temperature component. The steam will condense on the outside of an internal pipe in a jacketed system as long as the medium within the internal pipe is at a lower temperature than the steam.

To use steam as a heat source, the jacket vessels must be designed per the ASME Boiler and Pressure Vessel Code. Prior art water vapor removal systems use thin wall cylinders that will not meet code requirements. A secondary jacketed enclosure to contain the steam is also lacking as prior art water vapor removal systems have only an elevated temperature area (oven). In short, an open flame heat source is very difficult to keep at a constant temperature.

Additionally, prior art water vapor removal systems utilize cookers and coolers that are not capable of withstanding an internal vacuum pressure. This is understandable as pulling a vacuum on a vessel (system) is not easy to do. One major obstacle for pulling a vacuum on a vessel is the construction and configuration of the water vapor removal system. The vessels themselves need to be of a construction that will withstand pressure from the outside. As the pressure is reduced internally, the atmospheric pressure on the outside of the vessel pushes inward. At full vacuum, the shell of the vessel must be able to withstand 14.7 psi(a) pressure on the outside. The vessel construction must be designed to hold its integrity. If the vessel is not properly design, the structure risks collapse. The other major obstacle for pulling a vacuum on a vessel is being able to maintain that vacuum pressure while product flows in and out of the vessel. Therefore, the product entering the vacuum vessel must pass through an orifice or annulus system.

The prior art does not use a vacuum. However, if a water vapor removal system can be properly constructed and configured, the use of a vacuum to pull moisture from molasses and other high sugar substances becomes quite advantageous.

There is a need for a system for the removal of water vapor from molasses or other high sugar substances that utilizes steam as a heat source (steam heat transfer system).

There is also a further need for a system for the removal of water vapor from molasses or other high sugar substances that is of a construction and configuration that utilizes an internal vacuum pressure while maintaining structural integrity of the system and that is also able to maintain that vacuum pressure while product flows in and out of the vessel.

The present invention provides for a system for the removal of water vapor from molasses or other high sugar substances that utilizes internal vacuum pressure in combination with a jacketed heat exchanger (steam heat transfer system) and overcomes the shortcomings of the prior art.

BRIEF SUMMARY OF THE INVENTION

The present invention is a system composed of heating and vacuum elements for the purpose of removing water vapor from molasses or other high sugar concentrate substances through a continuous flow vacuum evaporated process. Alternatively, the system of the present invention could be used to remove water vapor from any substance where water removal is desired. Typically, the system of the present invention starts with a molasses or high sugar concentrate with a moisture content of up to 40 percent. After processing, the system of the present invention produces a high sugar concentrate product with a moisture content of less than 5 percent (<5%). This high sugar concentrate product is generally referred to as a "tub" and is comprised of dehydrated molasses and may include other dry ingredients, e.g., nutrients, vitamins, minerals, extra protein, pharmaceuticals, etc. . . . . In an alternative embodiment, the present invention further comprises a method of operating the system of the present invention.

It is an object of the present invention to provide for a system for the removal of water vapor from molasses or other high sugar substances that utilizes steam as a heat source (steam heat transfer system).

It is a further object of the present invention to provide for a system for the removal of water vapor from molasses or other high sugar substances that is of a construction and configuration that utilizes an internal continuous vacuum pressure while maintaining structural integrity of the system and that is also able to maintain that continuous vacuum pressure while product flows in and out of the vessel.

DETAILED DESCRIPTION OF THE INVENTION

Figure 1:
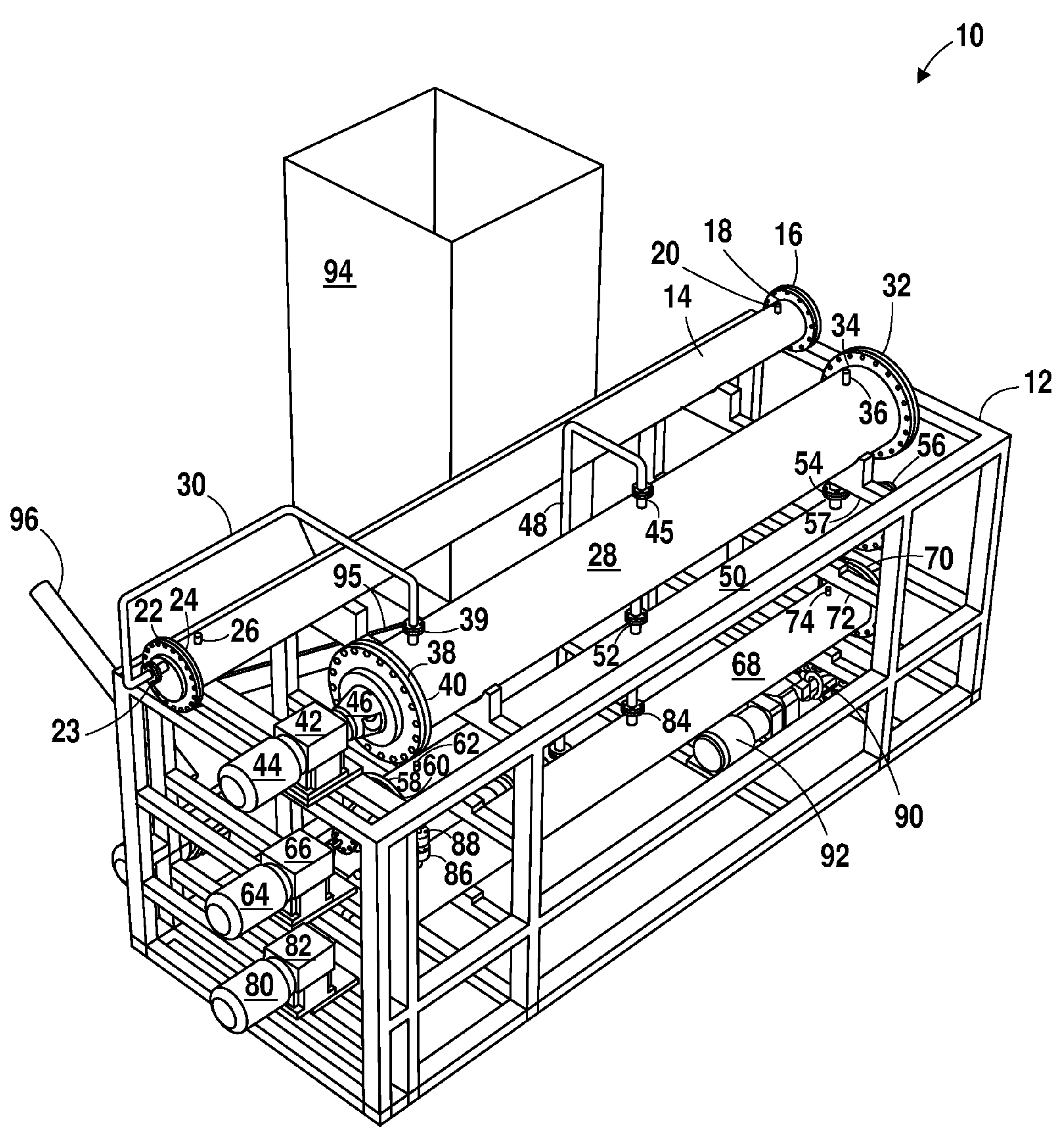
FIG. 1 is a front perspective view of an embodiment of the present invention.
Figure 2:
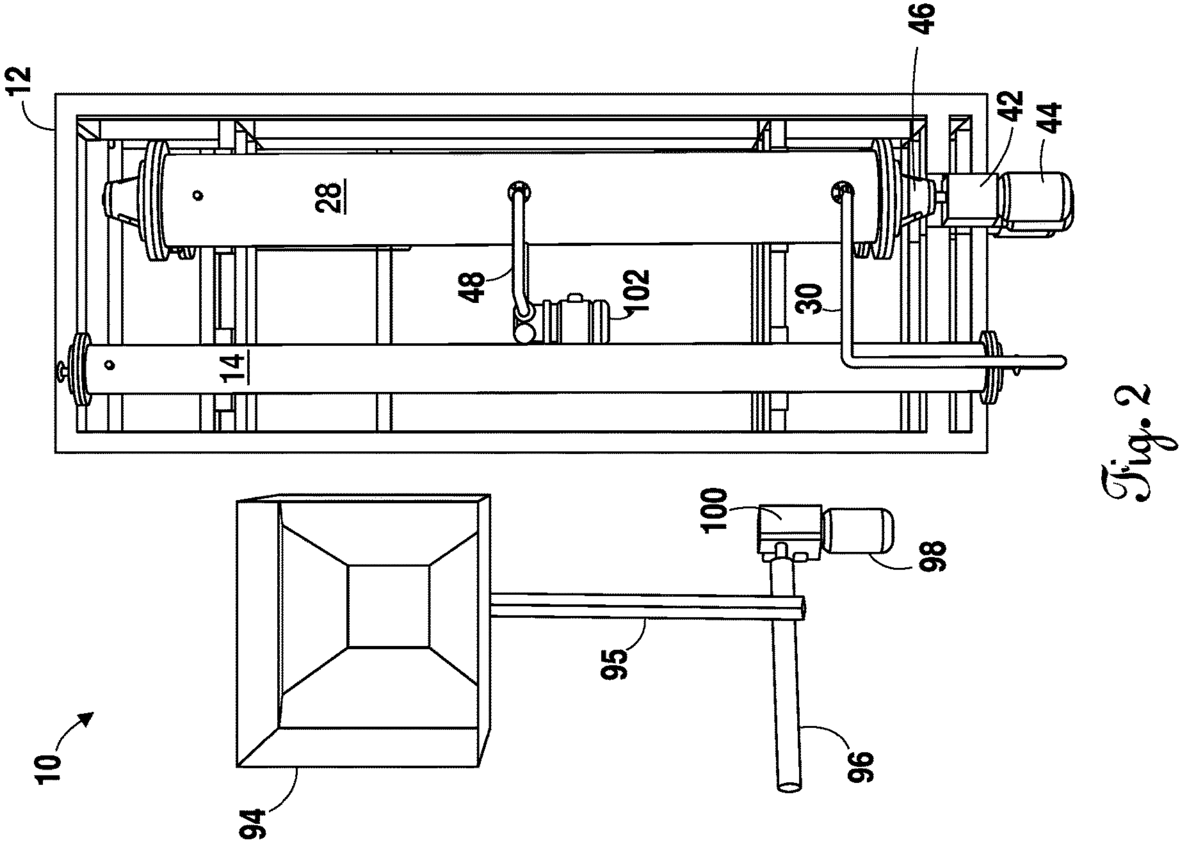
FIG. 2 is a top view of an embodiment of the present invention.

Referring now to FIGS. 1 and 2, water vapor removal system 10 comprises a multi-level frame 12 to which are attached several components, including a preheater, a heater, and two evaporators. Preheater 14 is a shell and tube heat exchanger (STHE). Preheater 14 has head 16 at end 18 and steam inlet 20 near end 18. Head 22 and steam inlet 26 are at opposite end 24. Preheater 14 is where molasses gets introduced to water vapor removal system 10. Samples generally have a moisture content of 20-35%. This is due to differences in grades of molasses as some grades contain more water than other grades.

The molasses sample enters water vapor removal system 10 at ambient temperatures. However, the temperature at which the sample exits water vapor removal system 10 is at 280-300 degrees F. The present invention uses 80 psi steam for water vapor removal system 10. The present invention can, however, obtain more flow and production by incrementally increasing this steam pressure. The present invention uses a 1.5 in. line that connects into heater 28. However, other comparable sizes may be used and still remain within the contemplation of the present invention.

Heater 28 has head 32 at end 34 and steam inlet 36 near end 34. Heater 28 has head 38 at end 40 and flanged connector 39 in close proximity to end 40. Head 38 is connected to gearbox 42 via conical coupling 46. Gear motor 44 is connected to gearbox 42.

Preheater 14 is fluidly connected to heater 28 via line 30 therebetween. Line 30 extends from flanged connector 23 of head 22 of end 24 of preheater 12 to flanged connector 39 on heater 28.

Flanged connector 45 is located near the middle (lengthwise) of heater 28. Heater 28 is fluidly connected to evaporator 50 at two locations. The first location is via line 48 extending from flanged connector 45 of heater 28 to flanged connector 52 of evaporator 50. The second location is through the coupling of two flanged connectors (only one flanged connector 54 can be seen in FIG. 1). Evaporator 50 has head 56 at end 57 and head 60 at opposite end 58 and steam inlet 62 in close proximity to end 58. Head 60 is connected to gear motor 64 via gearbox 66.

Evaporator 68 is constructed similar to evaporator 28, having head 70 at end 72 and steam inlet 74 in close proximity to end 70. Head 114 (cannot be seen in FIG. 1) is connected to gear motor 80 via gearbox 82.

Evaporator 50 fluidly connects to evaporator 68 in two locations. The first is via line 48 extending from flanged connector 52 of evaporator 50 to flanged connector 84 of evaporator 84. The second location is through the coupling of two flanged connectors.

Bin 94 stands adjacent to frame 12. Dispensing line 95 extends downward from the bottom of bin 94 then curves in an upward direction. See, e.g., FIGS. 1 and 5. Dispensing line 96 dispenses final product once processed and is powered by motor 98 via gear box 100.

Figure 3:
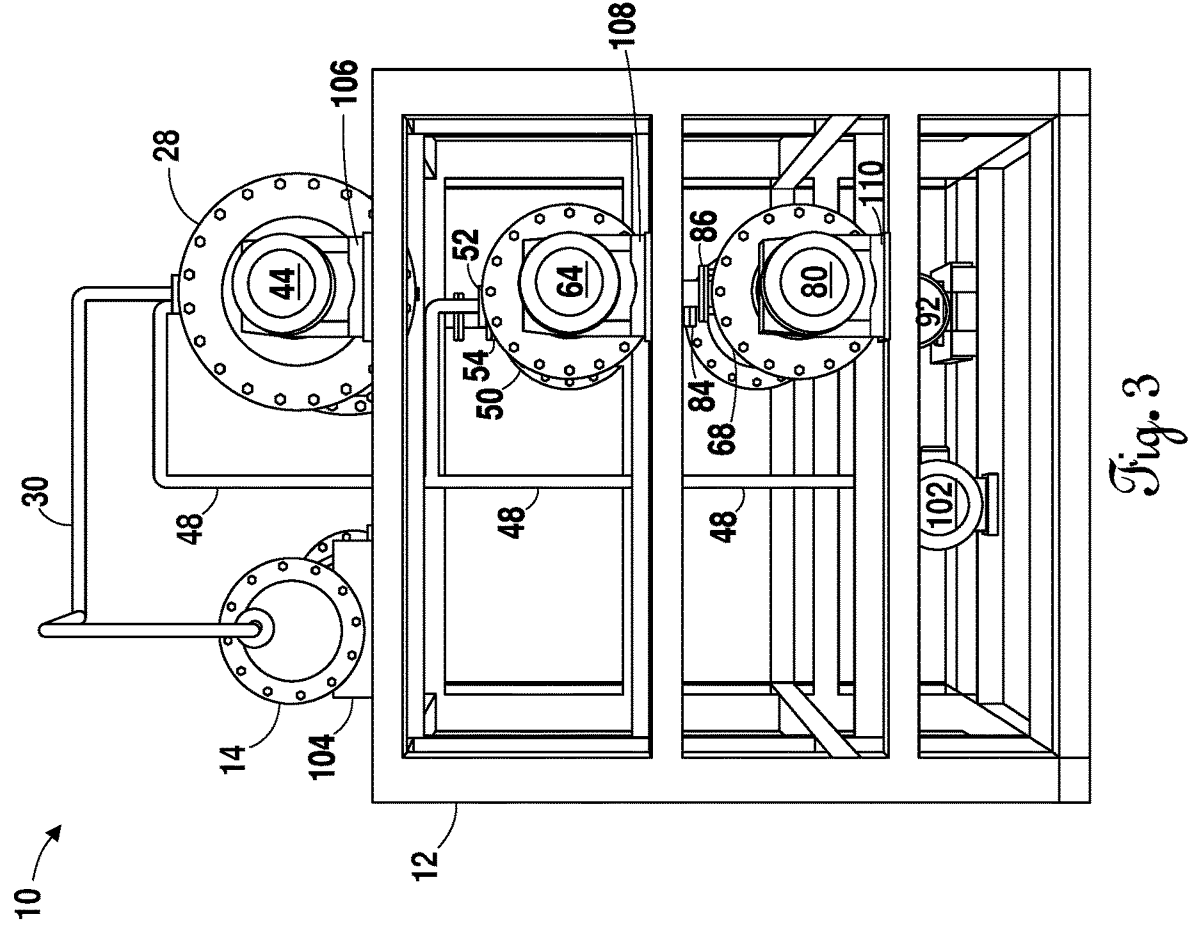
FIG. 3 is a front view of an embodiment of the present invention without the bin.
Figure 4:
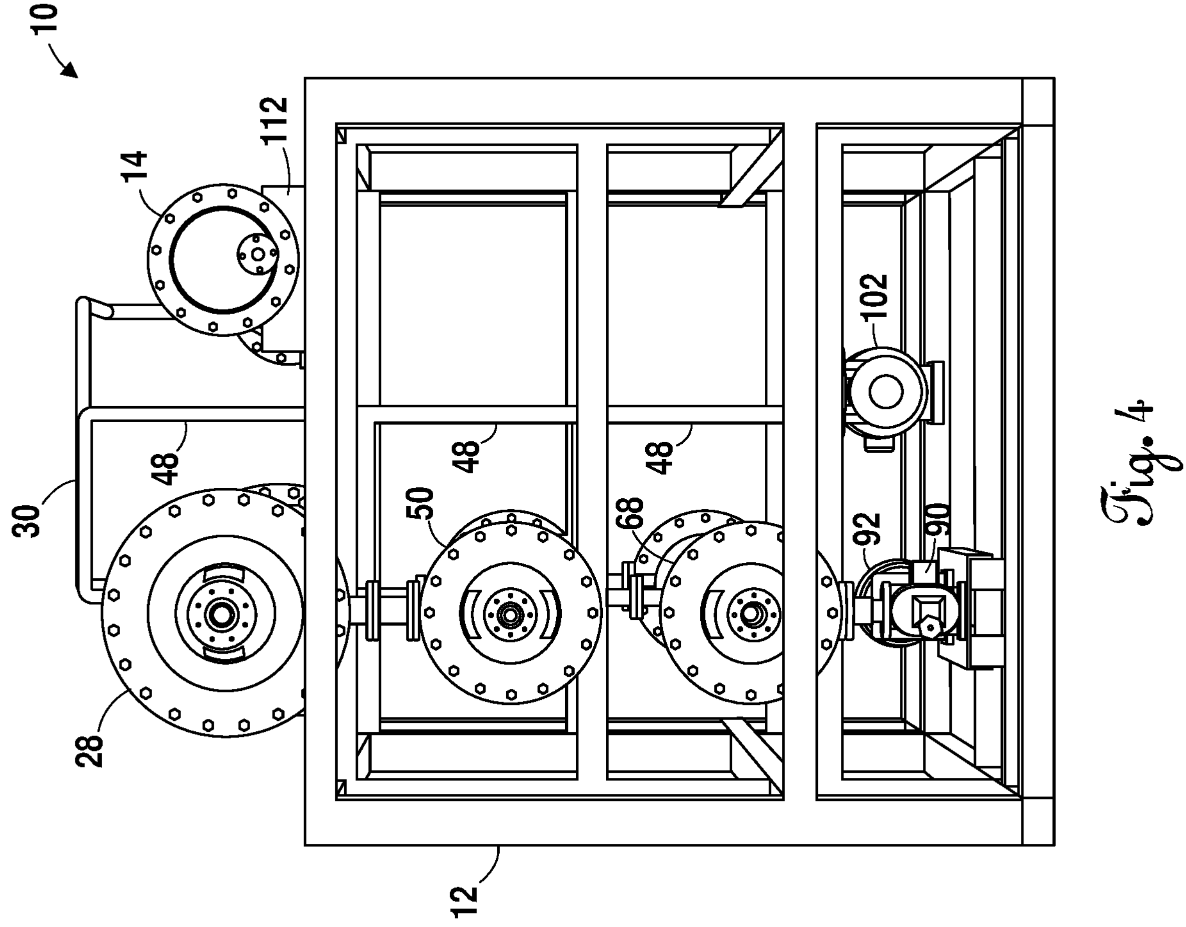
FIG. 4 is a back view of an embodiment of the present invention without the bin.

Referring now to FIGS. 3 and 4, the front and back of water vapor removal system 10, respectively, is shown without bin 94. Frame 12 is an open multi-level frame to which preheater, heater, evaporators, gear motors, isolation device and pump are attached. Frame 12 has space sufficient within each level to accommodate these components. Preheater 14 and heater 28 are positioned parallel to each other at the top level of multi-level frame 12, as shown in FIGS. 3 and 4. Heater 28 is positioned above evaporator 50. Evaporator 50, in turn, is positioned above evaporator 68.

Vacuum line 48 is shown connecting heater 28, evaporator 50, and evaporator 68. Vacuum line 48 traverses vertically downward from heater 28 at the top of frame 12 to the bottom of frame 12, terminating at vacuum pump 102. Vacuum pump 102 is secured to frame 12 and provides and maintains the vacuum pressure within heater 28 and evaporators 50 and 68. The present invention uses a liquid ring vacuum pump as vacuum pump 102 to pull a vacuum on evaporators 50 and 68. This creates 7.5-10 of vacuum power by using water to create a progressive cavity to create vacuum to pull out moisture from evaporators 50 and 68. Vacuum line 48 is a 2-inch line. While the present invention uses a vacuum line with this dimension, other comparable sized lines may also be used and still be within the contemplation of the present invention.

Figure 5:
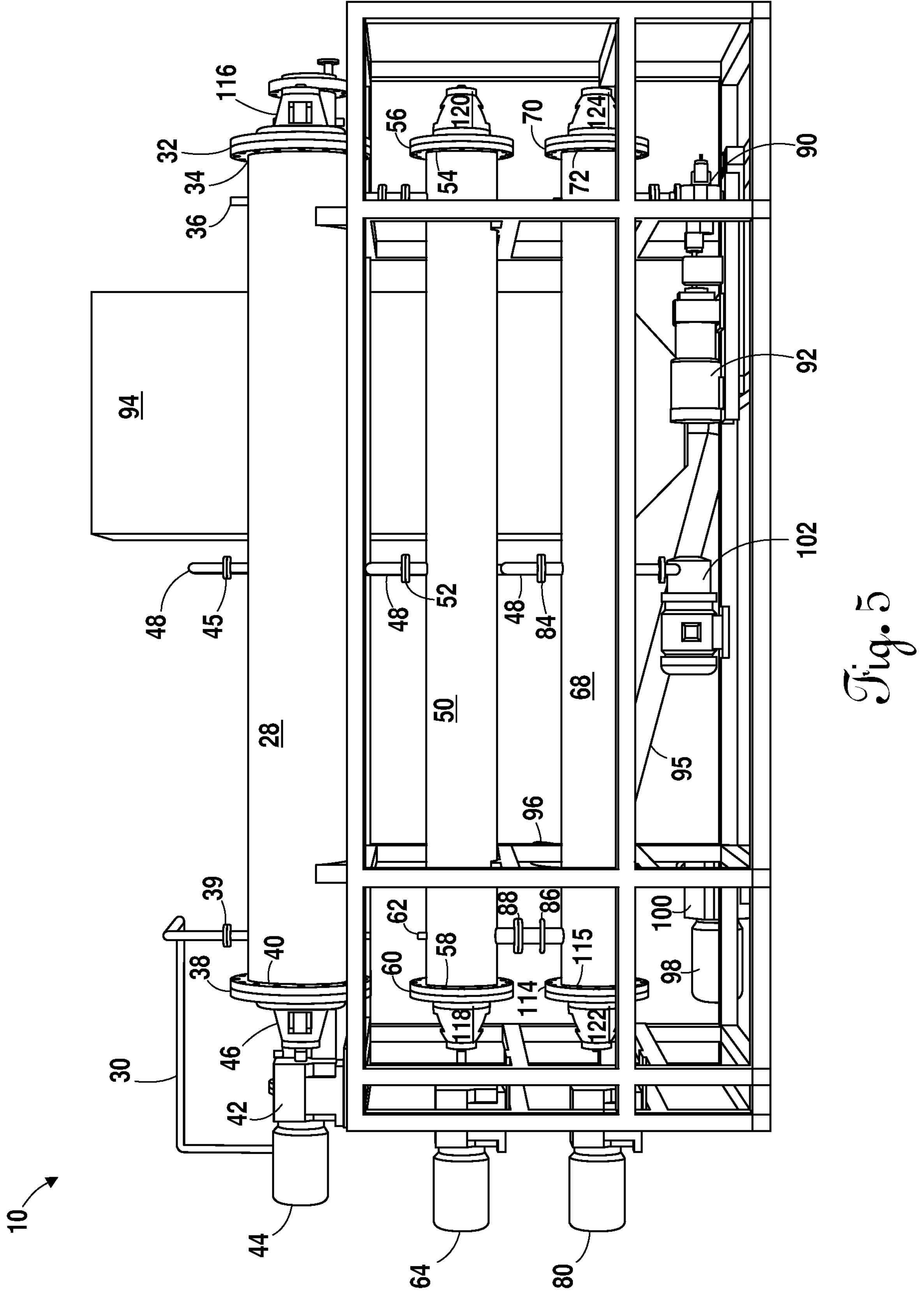
FIG. 5 is a right-side view of an embodiment of the present invention including the bin.
Figure 6:
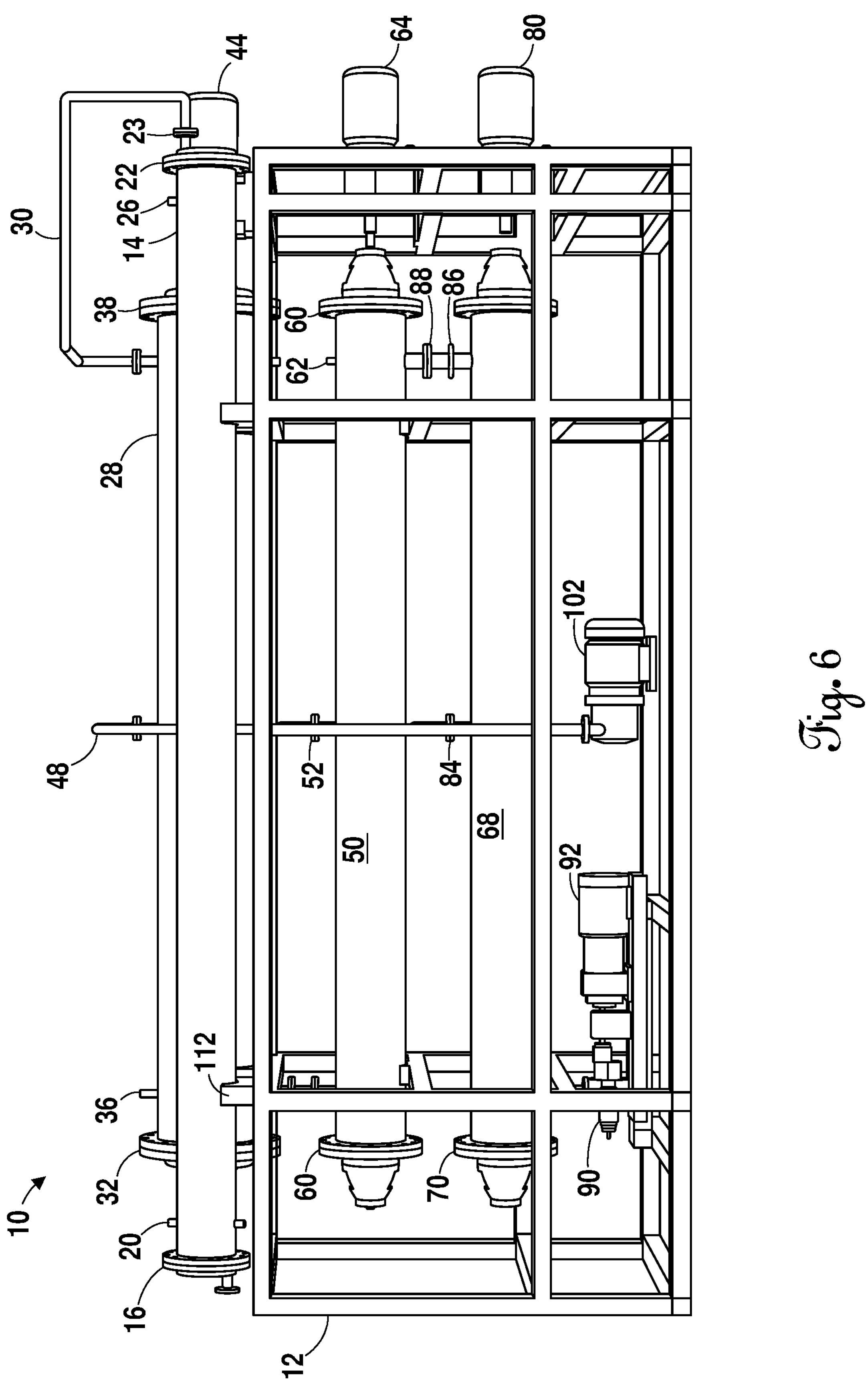
FIG. 6 is a left view of an embodiment of the present invention without the bin.
Figure 7:
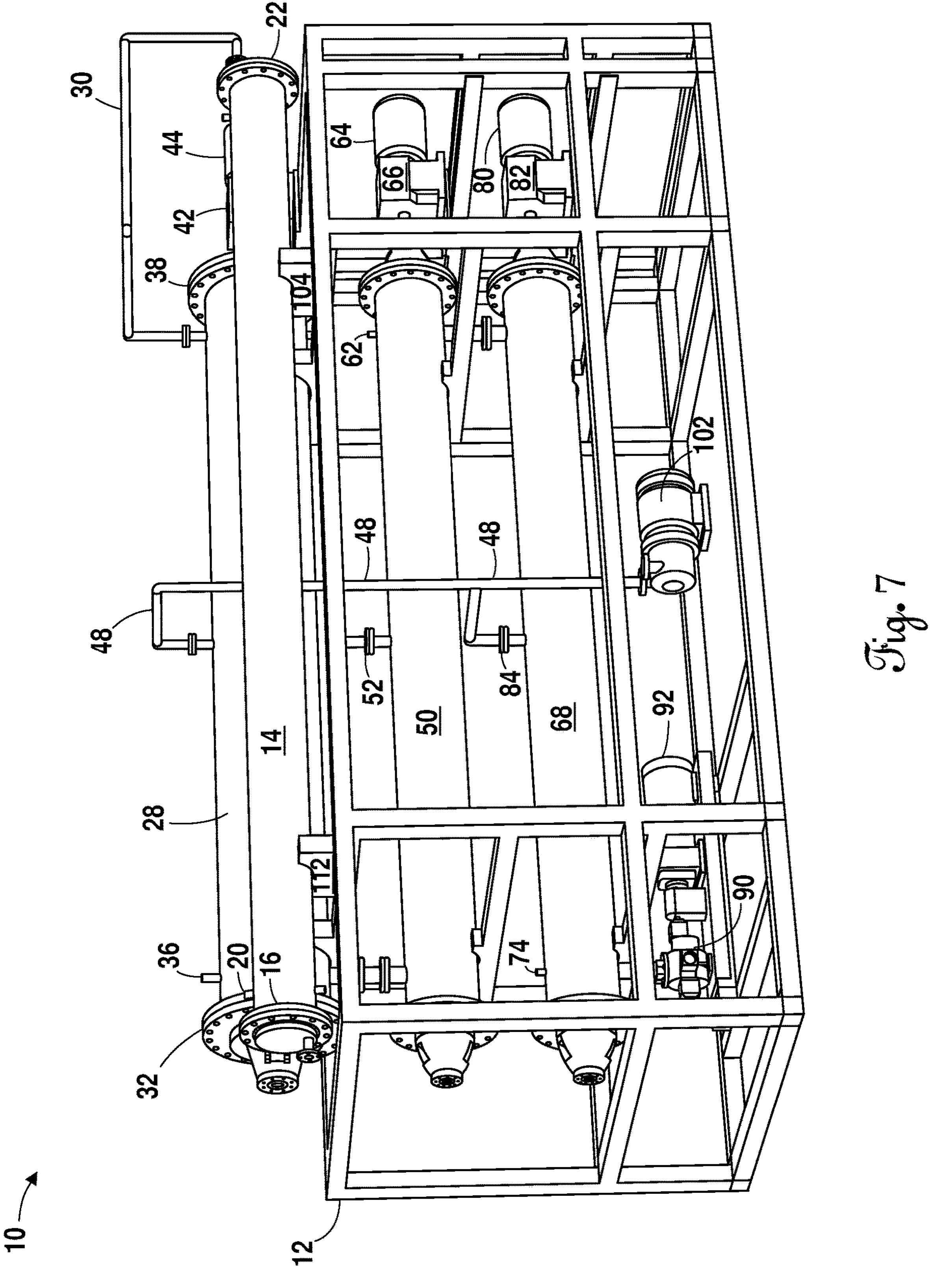
FIG. 7 is a left side perspective view of an embodiment of the present invention without the bin.

Referring now to FIG. 5, head 114 is at end 115 of evaporator 68. Additionally, conical connector 116 is shown at end 18 of heater 28. Evaporator 50 also has conical connectors 118 and 120 at opposite ends 57 and 58, respectively. Evaporator 68 has conical connectors 122 and 124 at opposite ends 72 and 115, respectively. FIGS. 6 and 7 illustrate right side and right side perspective views of water vapor removal system 10, respectively, but without bin 94.

Isolation device 90 is connected to motor 92 that incorporates a gearbox. The combination isolation device, gear box and motor rotates pump/isolation device 90 at a low rate (slowly). Generally, rotations are at about 800-1200 rpm. However, rotations of the present invention are at 10-30 rpm. In other words, the isolation device 90 spins very slow. And this is desirable because if isolation device 90 spins too slow, this causes a buildup of evaporated molasses in the evaporators. This, in turn, requires maintenance to fix it. The inventor has found that the preferred speed is to run at 10-30 rpm.

Once the molasses sample comes out of isolation device 90, water vapor removal system 10 tends to pull air in from the outside. To compensate for this phenomenon, configuration of the connecting pipes (not shown) is made vertical, then valve the connecting pipe through a smaller pipe. This results in product ending up in a smaller pipe which has the effect of creating a pressure drop. This is because a smaller diameter gives a bigger delta p and allows the system to run a bit longer if there is sufficient delta pressure (delta p). One other measure that may be done is to insulate the vertical larger pipe and smaller vertical pipe. Insulation includes any type of piping insulation and may include a wrap used on fiber glass material and applying a coating all over it to insulate a line without having a big aluminum jacket.

Heater 28 is maintained at atmospheric pressure (~14.5 psi). No heat is applied to evaporator 50. Instead, evaporator 50 (and evaporator 68) operate at a vacuum at −10 Vacuum (about 4 psi). A discharge pipe (not shown) pulls excess steam and water from water vapor removal system 10, discharging same to a remote predetermined location (e.g., drainage, ground).

Raised wedges at each end of preheater 14, heater 28, evaporators 50 and 68 are used to keep the cylindrically shaped preheater 14, heater 28, and evaporators 50 and 68 from rolling side to side or otherwise moving. For example, and to the extent same can be seen, raised wedges 106, 108 and 110 secure heater 28, evaporator 50 and evaporator 68 in place, as shown in FIG. 3. Raised wedges 104 and 112 hold preheater 14 securely in place, as shown in FIGS. 3 and 4.

The present invention works as follows. The water contained inside the molasses (or other high sugar substance) (or just water alone) when exposed to a vacuum is more easily evaporated, e.g., putting a certain amount of energy to get the water to boil. With a vacuum, not as much energy is needed. As a vacuum is pulled, less temperature needed. For example, at −7 psi, less heat is needed to boil the water than at atmospheric pressure. By pulling a vacuum through this hot molasses (or other high sugar substances), this principle allows more molasses to get out faster. Not getting more water out, but getting the molasses out faster.

The conventional way tub producers pull water is via heat exchangers that pull-out moisture then it gets agitated. In contrast, the present invention uses continuous flow and is able to isolate pressure via evaporator 50 and maintain vacuum in evaporator 68.

The vacuum pressure inside evaporator 50 and evaporator 68 needs to be able to prevent the atmospheric pressure from getting in evaporator 50 and evaporator 68 or else vacuum pressure will not be achieved. So the present invention must be able to isolate. The present invention provides the advantage of maintaining flow going in and continuous flow throughout while simultaneously maintaining vacuum pressure.

Augers come in different shapes and sizes. The augers used in the present invention extend the length of the heater and evaporators and may be 16 ft. in length. While this is the length used in the present invention, other comparable (longer or shorter) lengths (depending on the lengths of the heater and evaporators) may be used and still remain within the contemplation of the present invention.

To maintain a vacuum in evaporators 50 and 68 while product flows in and out of evaporators 50 and 68, the product entering the vacuum evaporators 50 and 68 must pass through an orifice or annulus system. Water vapor removal system 10 includes close clearance vacuum isolation device (CCVID) 90 as that orifice or annulus system. Evaporators 50 and 68 operate at same pressure and same vacuum. There is just an open pipe between them. As a result, whatever vacuum that is in evaporator 50, this same vacuum is in evaporator 68. The vacuum unit is psi. −14.7 psi is negative. The present invention operates at −7-10 psi. The closer to −14 psi that the system of the present invention gets, the more water that may be pulled out and the higher the increase in the process flow. The inventor notes it is difficult to do this at absolute vacuum.

Figure 8:
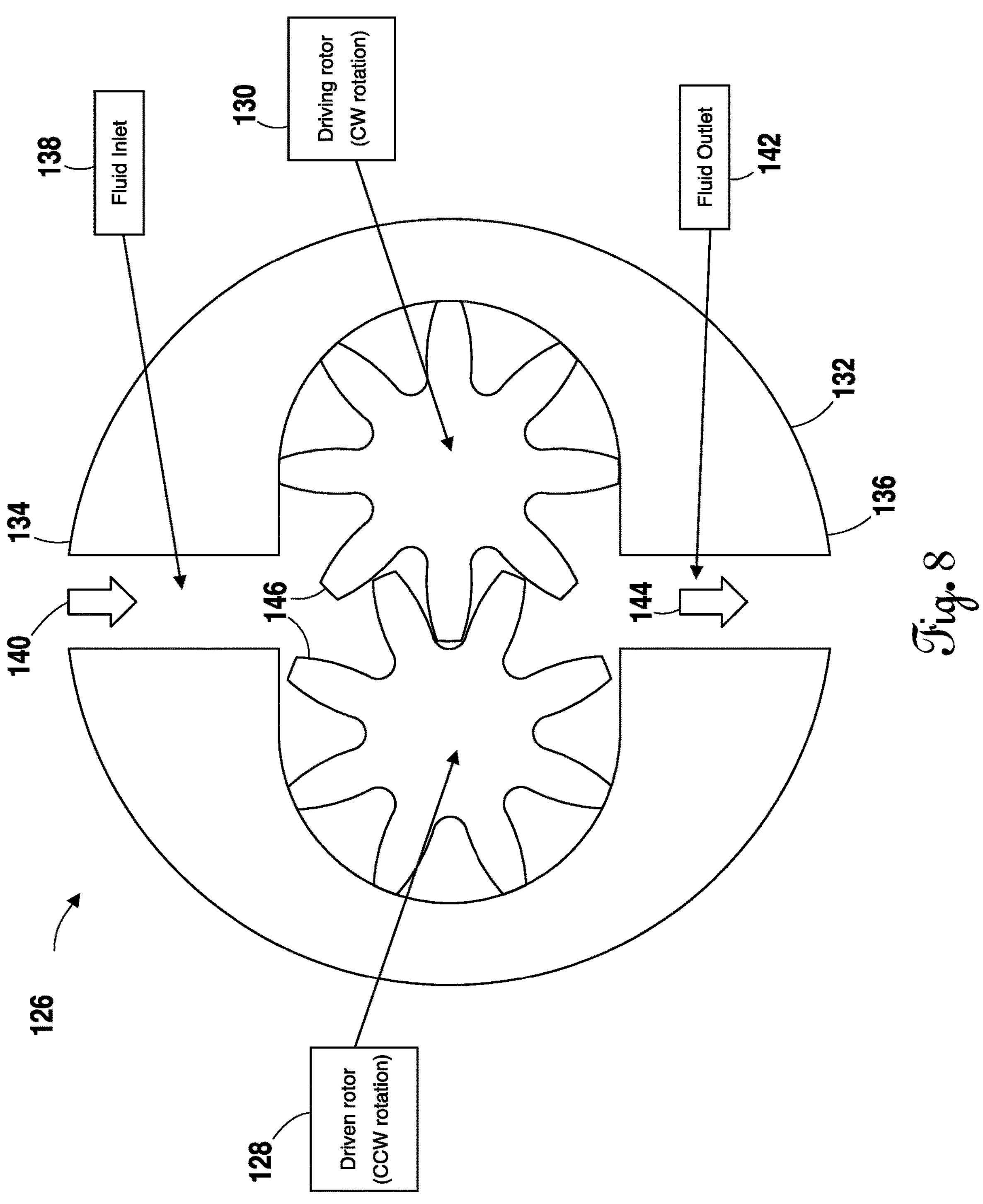
FIG. 8 depicts a front cross section view of the close clearance vacuum isolation device (CCVID) of the present invention.

Referring now to FIG. 8, cross section 126 of CCVID 90 is shown. CCVID 90 serves the purpose of preventing the outside atmospheric pressure from entering the vacuum area while also allowing dehydrated liquid to exit evaporators 50 and 68. This works similarly to a rotary valve which is used in dry services allowing material to pass a pressure boundary while preventing vacuum or pressure loss in the vessel. However, a standard rotary valve configuration will not work with a viscous liquid material. Therefore, CCVID 90 solves this problem.

The design of this entrance (orifice or annulus) system passes a known quantity of fluid that is equal to the production rate. This is known as a pressure boundary. Likewise, the product exiting the vacuum vessel or evaporator must also pass a pressure boundary. The exit is complicated by the viscosity of the fluid, e.g., molasses. A pressure boundary in a dry service can be accomplished by using a rotary valve. But, as indicated above, this is not an option in a viscous liquid service because the viscous liquid will stick to the valve components and never completely leave the vacuum system. Therefore, the exit pressure boundary must introduce a novel approach to serve both functions of conveying the evaporated molasses beyond the pressure boundary as well as maintaining a pressure seal during the conveyance.

CCVID 90 utilizes high precision manufacturing not typically available to large manufacturers. CCVID 90 utilizes reduced clearances in the radial and axial direction. To achieve functionality, the manufactured parts must be produced with very tight dimensional tolerance and near zero runout.

CCVID 90 works by engaging two teethed rotating components: driven rotor 128 and driving rotor 130. Each rotating component 128 and 130 has a machined profile that allows it to engage the other rotating component as in teeth 146 on a gear, as shown in FIG. 8. The tooth engagement ensures that both rotating components spin together at the same rotational speed albeit in opposite directions. One rotating component (driving rotor 130) rotates in a clockwise direction and is motorized while the other rotating component (driven rotor 128) rotates in a counterclockwise direction and is driven through the tooth engagement. Both rotating components 128 and 130 are fixed on both axial ends by precision ball bearings mounted in a housing 132. The bearings ensure there is limited radial and axial movement of rotating components 128 and 130 within housing 132. This is important due to the minimal clearances between housing 132 and rotating components 128 and 130.

Still referring to FIG. 8, the viscous liquid enters CCVID 90 via fluid inlet 138 through a flanged connection in the direction of arrow 140 at top 134 of CCVID 90. As rotors 128 and 130 spin within housing 132, the viscous material passes on the outside of rotors 128, 130 within housing 132. The viscous material exits CCVID 90 in the direction of arrow 144 through bottom 136 of CCVID assembly 90. The viscous material cannot remain within CCVID assembly 90 due to the tooth engagement that exist between rotating components 128, 130.

Vacuum isolation is maintained due to the close clearance between housing 132 and rotors 128, 130. This configuration most resembles a gear pump. Although, gear pumps operate at significant rotational speeds. The difference is that CCVID 90 utilizes much closer radial clearances than a typical gear pump and CCVID 90 functions at much lower rotational speeds. CCVID 90 works to isolate the vacuum chamber while passing the viscous fluid out of housing 132 rather than pumping the viscous fluid.

Viscous fluid is moved between housing 132 and rotors 128, 130 by the open teeth 146. The viscous fluid cannot flow through the teeth engagement area and must exit through fluid outlet 142. The close clearance areas are between the tip of the teeth 146 of rotors 128, 130 and the inside of housing 132. Another close clearance area exists between the end clearance of rotors 128, 130 and the inside of the housing (not shown).

Figure 9:
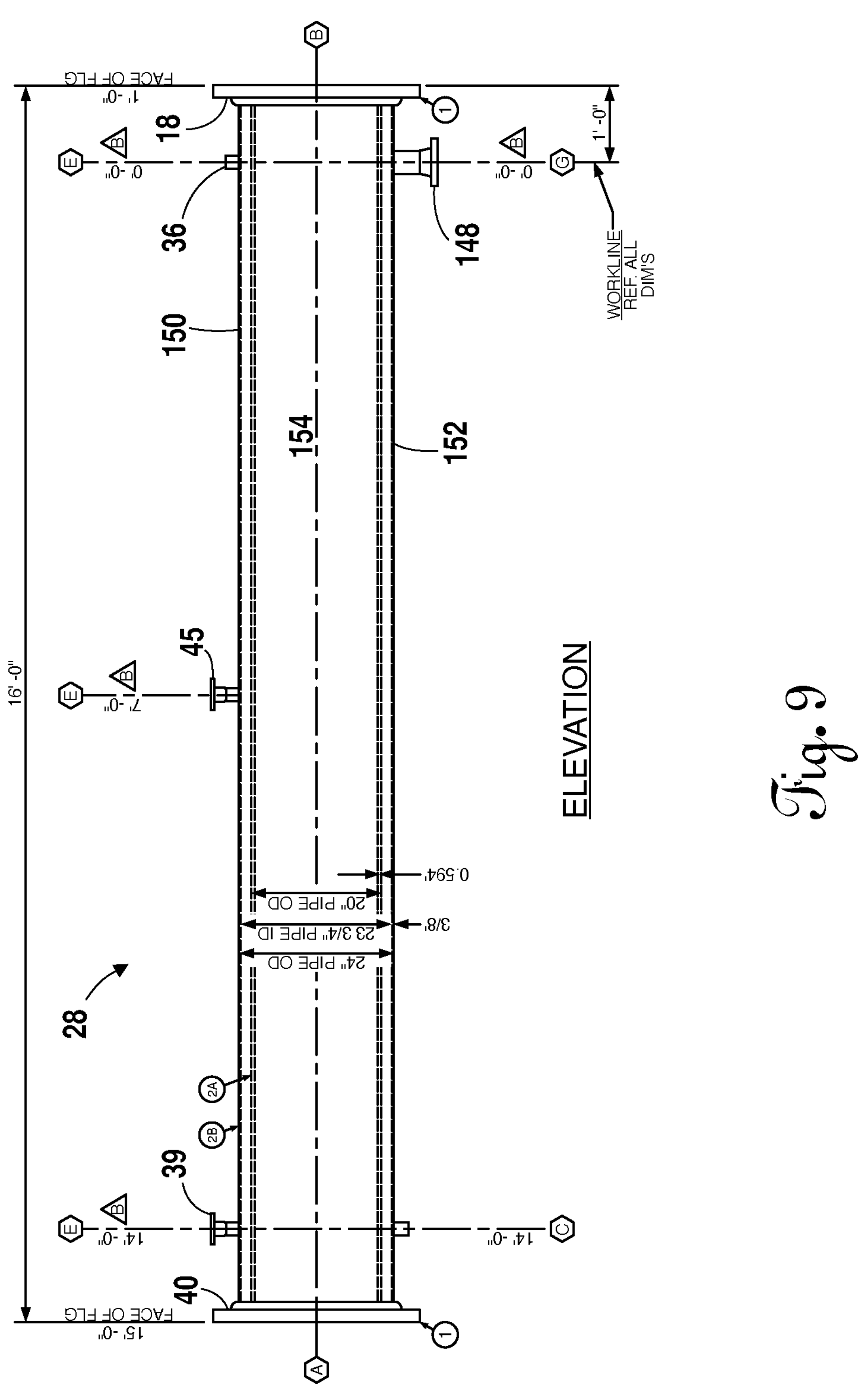
FIG. 9 depicts a cross section view of the heater of an embodiment of the present invention without the heads.

Turning now to FIG. 9, a cross section of heater 28 without heads is shown. Narrow steam areas allow steam to traverse the length of heater 28. Heater 28 is 16 ft. in length, has an end diameter of 15 in., a 24" OD and a 23¾" ID. The internal "pipe" 154 defined as the area between the double dotted lines has a 20" OD. Small areas 150 and 152 along top and bottom, respectively, of inside of heater 28, defined by double dotted lines within heater 28, are steam areas. More particularly, the area between this 20" OD and the interior wall of heater 28 comprises the steam area. Heater 28 is essentially a pipe inside a pipe. Flanged connector 39 provides the opportunity to reach the steam area before exiting out through flanged connector 148. Flange connector 148 is 3 in. in length.

An internal auger will mix the fluid, e.g., molasses (or other high sugar substance), while the fluid travels along the length of heater 28. A steam jacket may be used. Fluid (molasses) comes into heater 28 via flanged connector 39 and travels down the length of heater 28. An auger (not shown) within heater 28 turns and mixes the fluid. Heating is applied allowing water to escape from the molasses. The molasses then drops out on of the bottom of heater 28 via flange connector 148 while steam from the water is being removed from the molasses and escaping via steam outlet 36. The present invention removes most of this moisture from the molasses which, having exited the system as a final product, has a 5% moisture content.

Molasses tends to scale and adhere to the walls without a good cleaning program. Access to the tubes within the STHE preheater 14 is desired to perform routine maintenance and clear out stuck molasses. The present invention provides this access by securing the heads of the preheater to the preheater using fasteners such as nuts and bolts. To access the internal auger for clearing, the heads are removed by unscrewing the nuts. Under the head is a channel plate which works to guide the flow from one tube to the next.

Referring now to FIGS. 10-14, and using head 16 of preheater 14 as an example, as fluid (molasses or other high sugar substance) passes through the plurality of internal tubes within preheater 14 from one end to the other, the fluid must be guided once the fluid reached the opposite end of the preheater 14 to return through another of the plurality of internal tubes.

Figure 10:
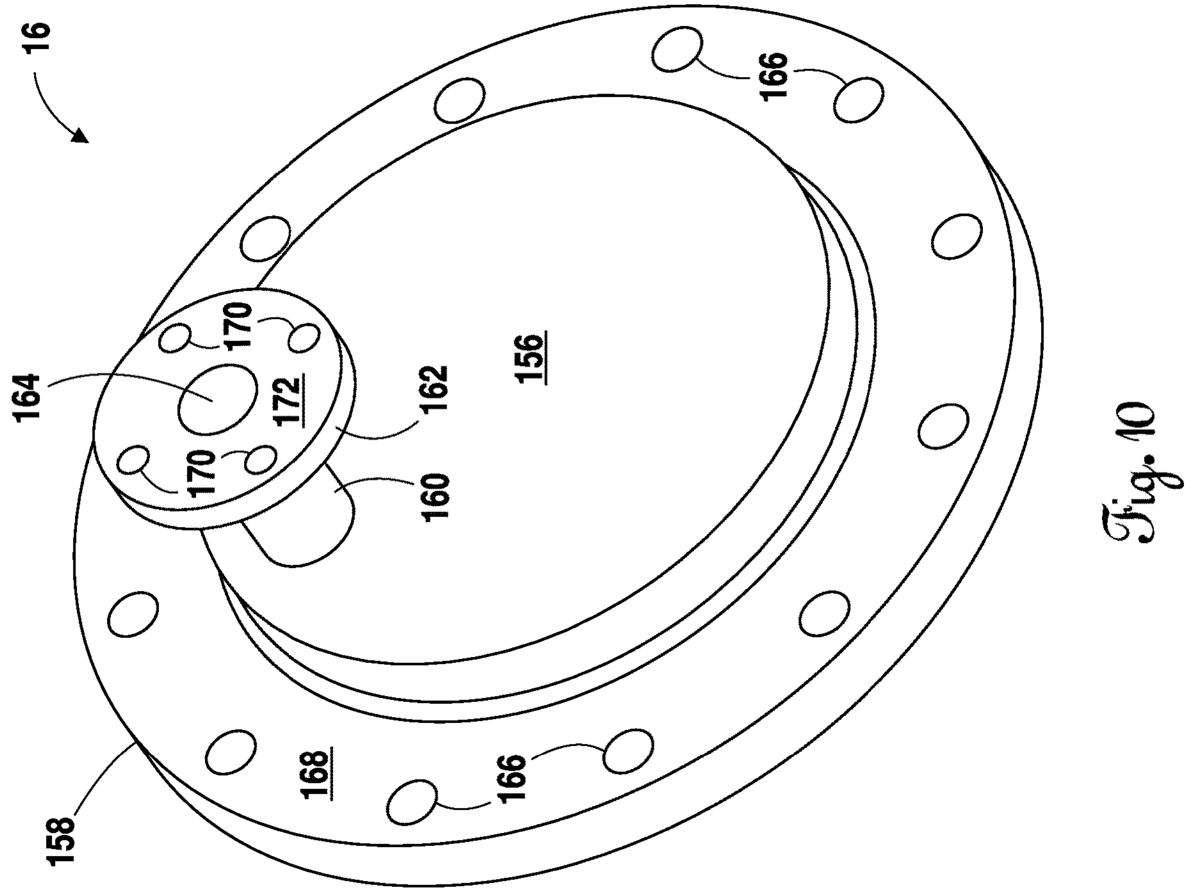
FIG. 10 depicts a perspective view of the head of the preheater of an embodiment of the present invention.

Head 16 is comprised of outer plate 156, channel plate 158 and outlet 160 having flange 162 extending therefrom. Aperture 164 traverses outer plate 156, channel plate 158, outlet 160 and flange 162, as shown in FIG. 10. A plurality of apertures 166 uniformly spaced at equidistance from each other along the perimeter of side 168 of channel plate 158 traverses channel plate 158 and are sized to accommodate fasteners (not shown). Fasteners (not shown) secure head 16 to end 18 of preheater 14. A plurality of smaller apertures 170 uniformly spaced at equidistance from each other along the perimeter of side 172 of flange 162 traverses flange 162 and are sized to accommodate fasteners (not shown). Aperture 164 serves as the introductory point where molasses is introduced to water vapor removal system 10 of the present invention.

Figure 11:
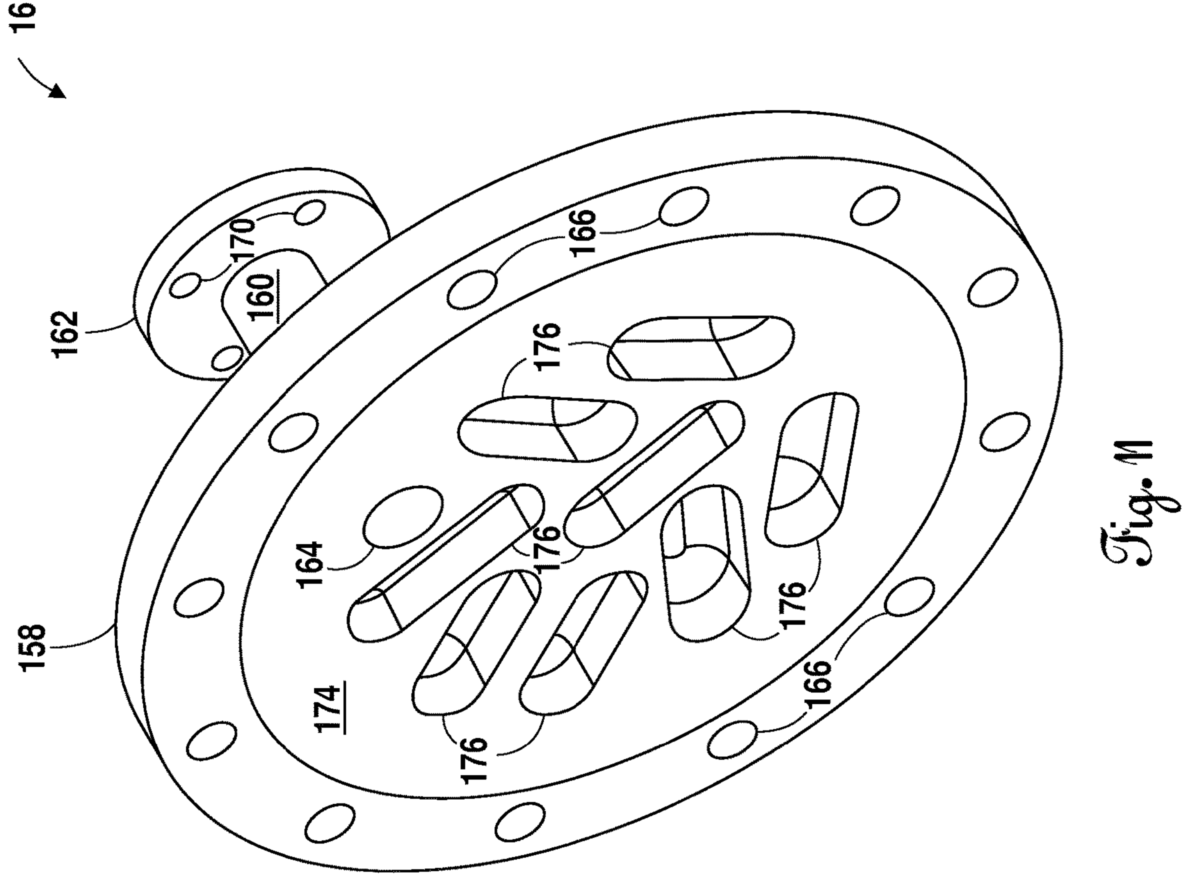
FIG. 11 is a perspective view of the cavities on the inside surface of the channel plate on the head of the preheater of an embodiment of the present invention.

Turning to FIG. 11, side 174 of channel plate 158 contains several cavities or channels 176 that accommodate the ends of two (2) internal tubes in the preheater 14 (STHE), one end of each tube abutting against the opposite ends of each channel. In the present invention, as mentioned, the STHE includes 17 tubes. Sixteen (16) of those would abut up against these channels such that channels 146 guide the flow of molasses from one tube to the next. The end of the last internal tube (not shown) connects to aperture 164 to provide an escape for the fluid (molasses) out of preheater 14 via outlet 160 through flange 162 of head 16.

Figure 12:
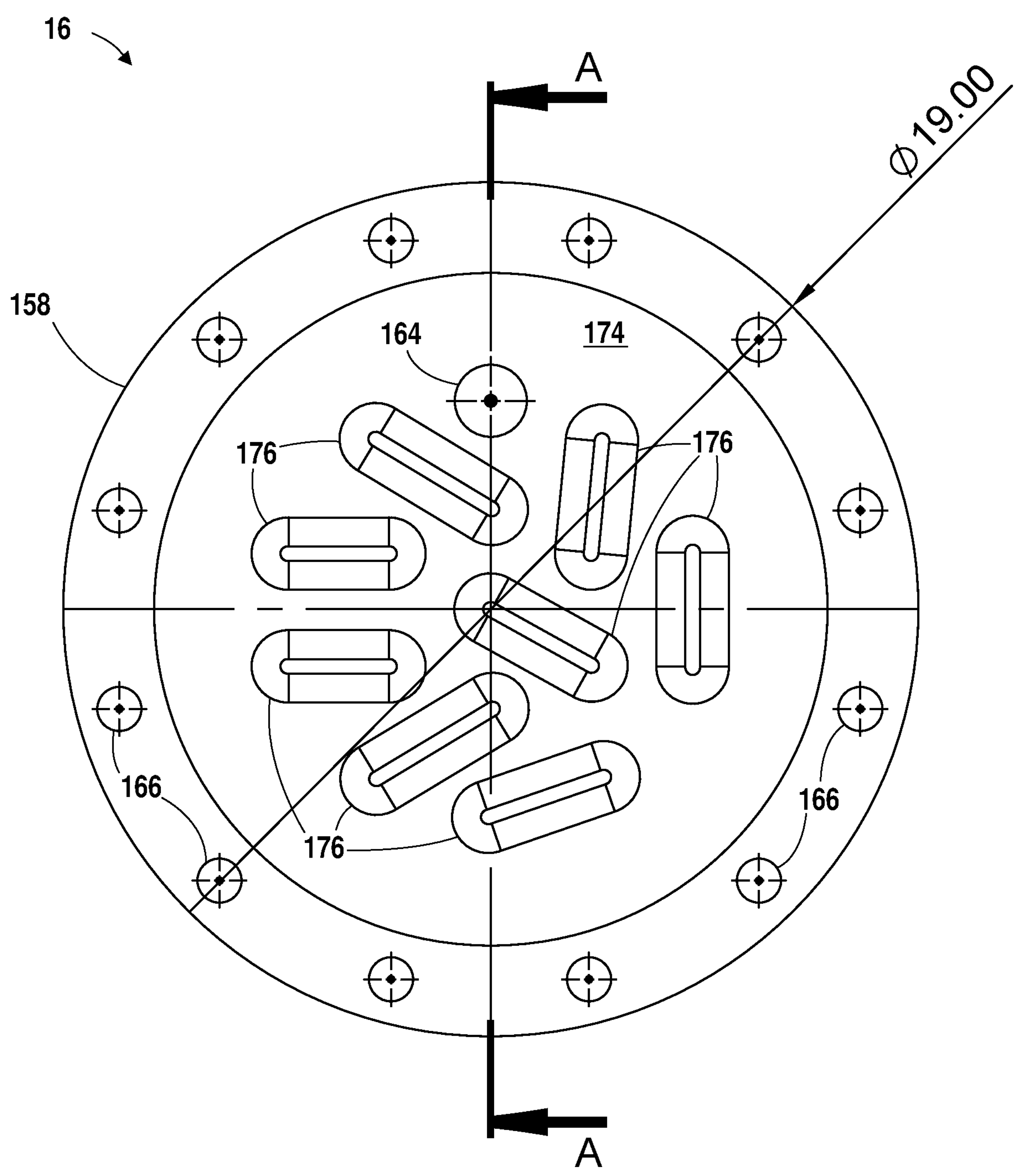
FIG. 12 is a front view of the cavities on the inside surface of the channel plate on the head of the preheater of an embodiment of the present invention.
Figure 14:
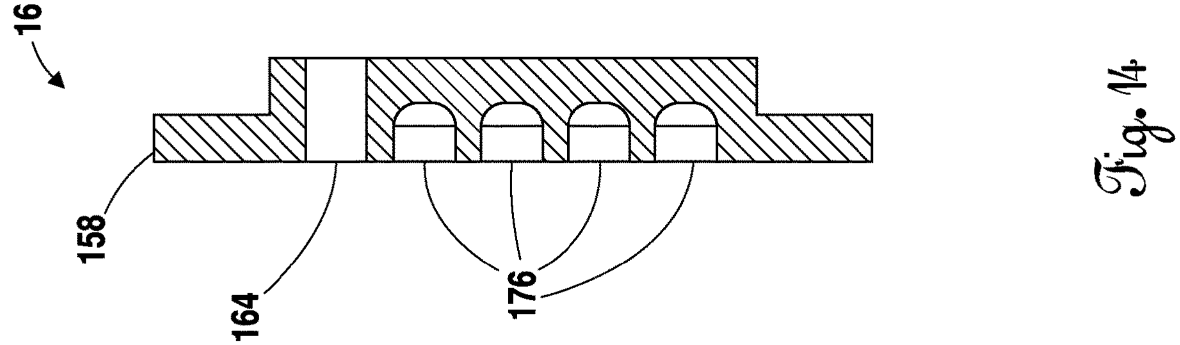
FIG. 14 is a cross sectional view along lines A-A with respect to FIG. 12 showing the cavities on the inside surface of the channel plate on the head of the preheater of an embodiment of the present invention.
Figure 13:
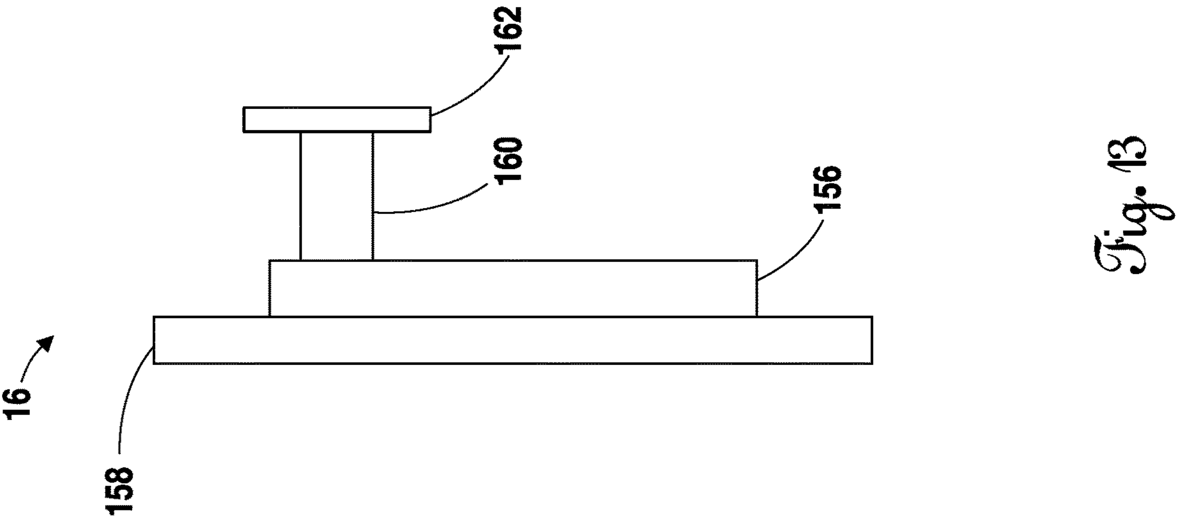
FIG. 13 is a right-side view of the head of the preheater of an embodiment of the present invention.

Referring now to FIG. 12, internal side 174 of channel plate 158 is 19 in. in OD. FIG. 13 shows a right side view of head 16 of preheater 14, illustrating the separate component parts of channel plate 158 attached to outer plate 156 with outlet 160 extending distally therefrom and ending in flange 162. FIG. 14 is a cross section of FIG. 12 taken across lines A-A. A plurality of channels 176 shows only grooves or channels 176 that do not traverse channel plate 158. Aperture 164 is shown traversing channel plate 158.

While FIGS. 10-14 used head 16 of preheater 14 as an example, this procedure may also be repeated for each of the heads that are attached to the heater and evaporators of the present invention.

Figure 15:
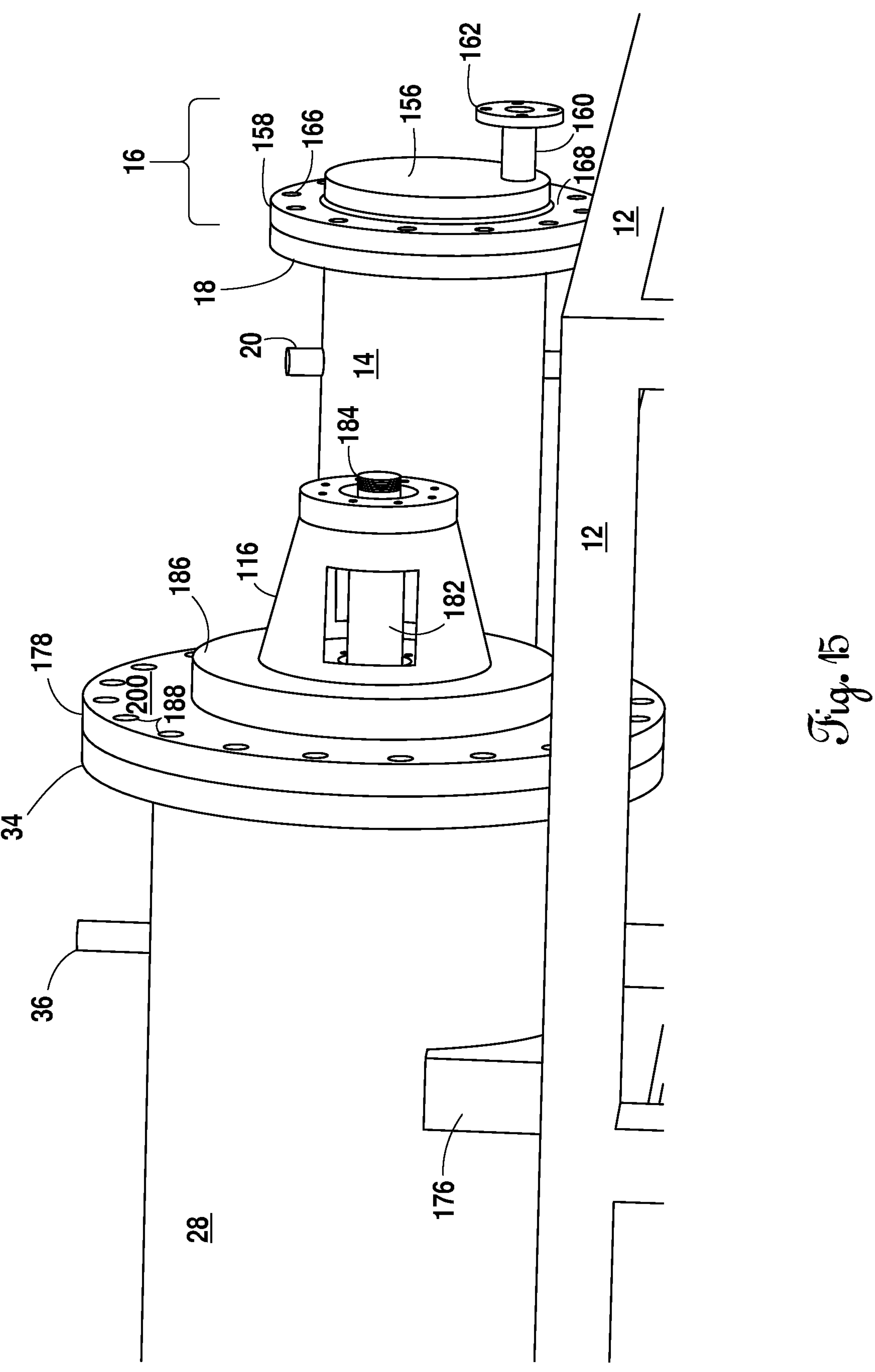
FIG. 15 is a close-up right side partial view of the heater and preheater of an embodiment of the present invention.

Turning now to FIG. 15, a close-up right side partial view of preheater 14 and heater 28 are shown. Preheater 14 has head 16 comprised of channel plate 158 and outer plate 156 with outlet 160 and flange 162, as previously discussed. Channel plate 178 is attached to end 34 via fasteners such as bolts or the like via apertures 188. Outer plate 186 is similarly attached to channel plate 178. Conical coupling 116 extends distally from side 200 of outer plate 186. Both preheater 14 and heater 28 are attached to frame 12 with raised wedge 176 supporting and securing heater 28, as shown in FIG. 15.

Still referring to FIG. 15, auger cylinder 182 traverses through the center of an area within conical coupling 116 and ends with threaded end 184 extending beyond conical coupling 116. Auger cylinder 182 also traverses the length of heater 28 internally, as will be discussed in further detail below. Auger cylinder 182 has threaded ends at each end though only threaded end 184 can be seen in FIG. 15.

Figure 16:
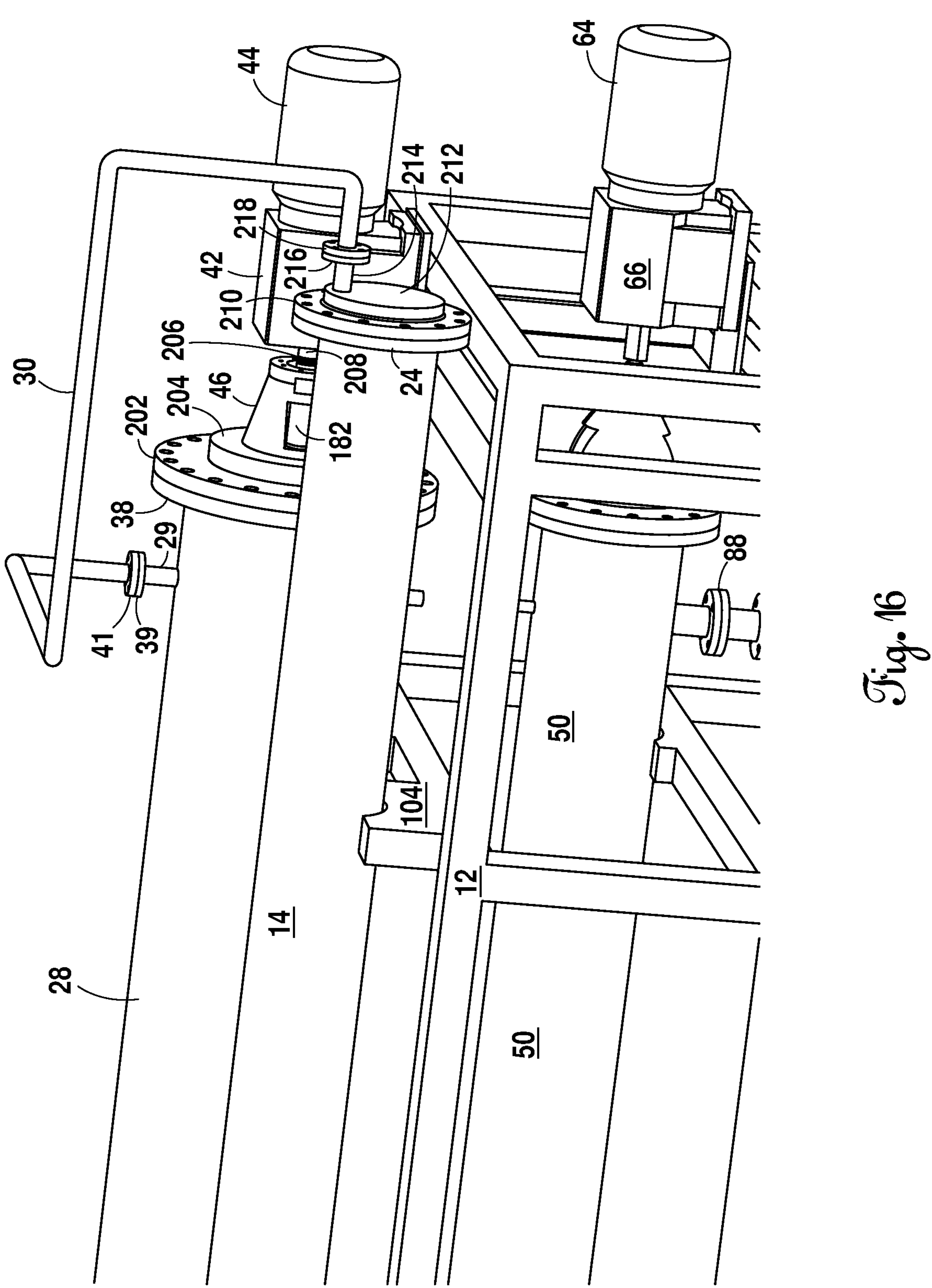
FIG. 16 is a close-up left side partial view of the preheater connected to the heater of an embodiment of the present invention.

Turning now to FIG. 16, a close-up left side partial view of preheater 14 connected to heater 28 is shown. Preheater 14 connects to heater 28 via line 30, attaching to heater 28 via the coupling of flange 41 to flange 39 on outlet 29. Line 30 attaches to preheater 14 via the coupling of flange 218 to flange 216 on outlet 214 extending from outer plate 212. End 24 of preheater 14 is attached to channel plate 210 via a plurality of fasteners that traverse through a plurality of apertures. Channel plate 210 similarly attaches to outside plate 204. Conical coupling 46 extends distally from outside plate 204. Auger cylinder 182 has threaded end 206 that attaches to shaft 208 extending from gearbox 42. Gear motor 44 attaches to auger cylinder 182 via shaft 208 and gearbox 42. Gear motor 44 drives auger 238 (not shown) to rotate internally within heater 28.

Figure 17:
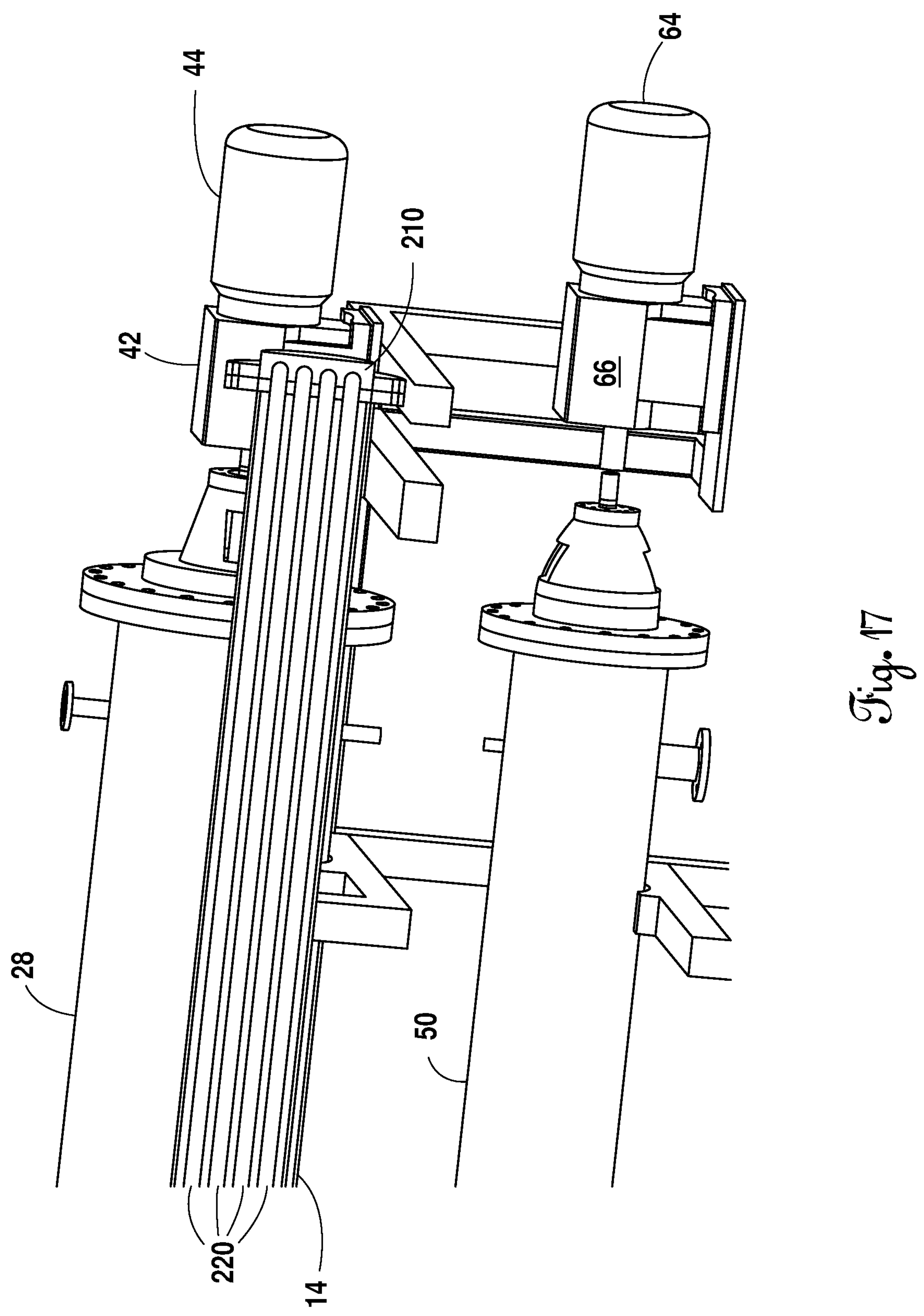
FIG. 17 is a close-up left side partial view of the preheater, heater and evaporator of an embodiment of the present invention depicting a cross sectional view of the preheater.

A cross section of preheater 14 is shown in FIG. 17. The cross section illustrates the plurality of tubes 220 that traverse the internal length of preheater 14. Preheater 14 is a shell and tube heat exchanger and discussed further below. Channel plate 210 of preheater 14 illustrates the channels or cavities therewithin (See, FIGS. 10-14 and related discussion above).

Figure 18:
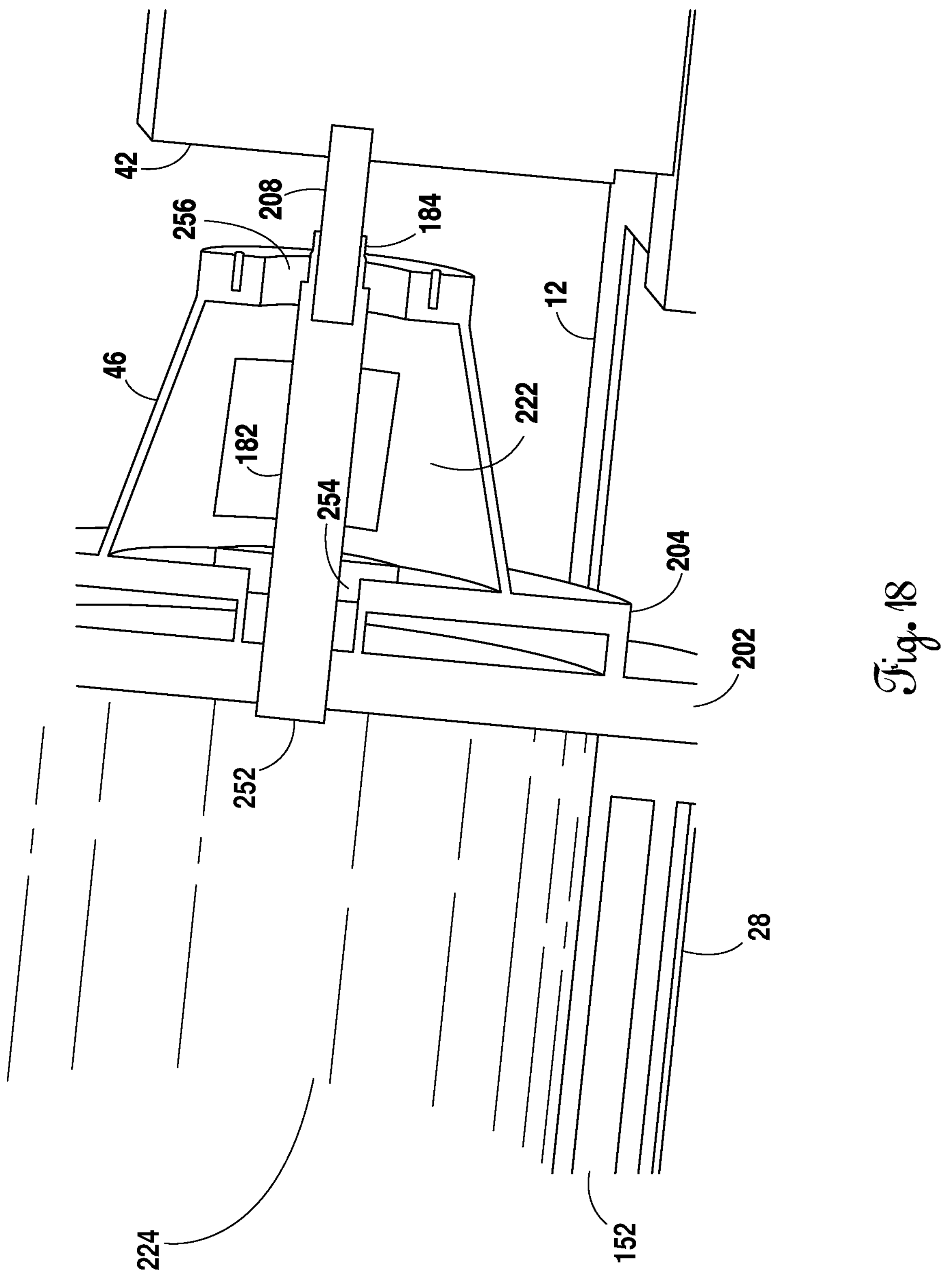
FIG. 18 is a close-up left side partial detailed cross-sectional view of the heater of an embodiment of the present invention showing the open area surrounding the shaft where rings of packing and bearings are contained.

Turning now to FIG. 18, a close up detailed partial cross sectional view of heater 28 is shown. Shaft 208 extends from gearbox 42 and engages threaded end 184 of auger cylinder 182. Auger cylinder 182 traverses through the center of area 222 defined by conical coupling 46. Packing (not shown) is placed within area 222. Bearings (not shown) are also included within this bearing area 222. This coupling transfers power from gear motor 44 to auger 238. The order then is gear motor, coupling, auger shaft, bearing area, auger shaft, auger. Packing box (not shown) is a way to isolate the pressure inside the vessel. Mechanical seals have also previously been used to isolate the internal pressure. However, the present invention uses packing in place of a mechanical seal. The packing used in the present invention is rope packing which is commercially available. Rope packing facilitates sealing and isolating that pressure area. However, mechanical seals may be used and still be within the contemplation of the present invention.

Still referring to FIG. 18, channel plate 202 has aperture 252 in the center thereof, outer plate 204 has aperture 254 in the center thereof, and conical coupling 46 has aperture 256 in the center thereof. Apertures 252, 254 and 256 are concentrically aligned such that auger cylinder 182 traverses through each of apertures 252, 254 and 256 of channel plate 202, outer plate 204 and conical coupling 46, respectively. Within heater 28 is heater area 224. Heater area 224 accommodates auger 238 therein.

Figure 19:
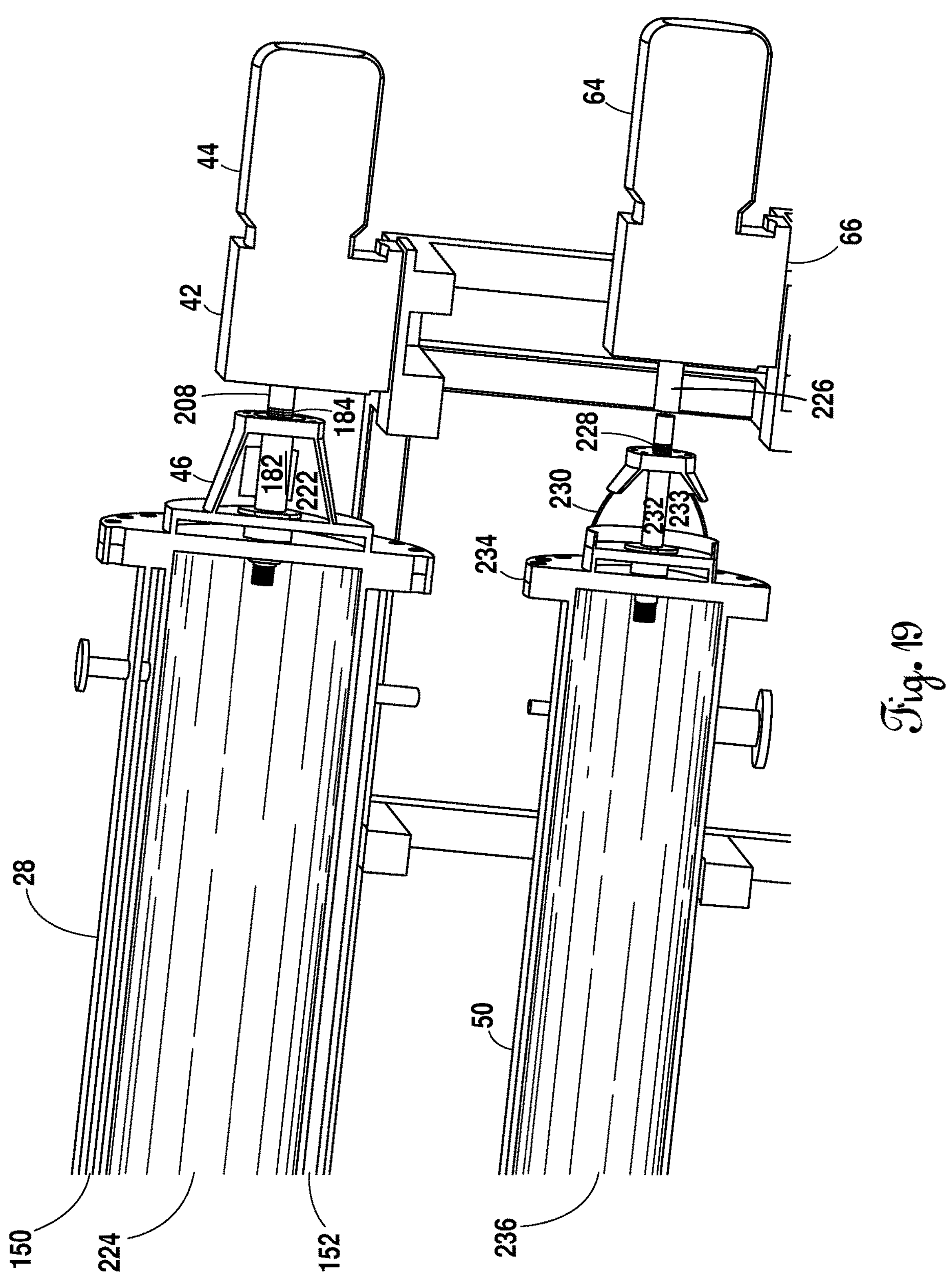
FIG. 19 is a partial right-side cross-sectional view of the heater and evaporator of an embodiment of the present invention showing the area that accommodates the augers.

Turning now to FIG. 19, a cross section of heater 28 and evaporator 50 is shown with respect to FIG. 17, except preheater 14 has been removed for illustration purposes. Shaft 226 extends from gearbox 66 and engages threaded end 228 of auger cylinder 232. Auger cylinder 232 traverses through the center of area 233 defined by conical coupling 230. Packing (not shown) is placed within area 233. Bearings (not shown) are also included within this bearing area 233. This coupling transfers power from gear motor 64 to auger cylinder 232 which in turn causes the auger inside evaporator 50 to rotate. Steam areas (where steam travels)—small areas 150 and 152—are shown within heater 28. Small area 150 is near the top of heater 28 and small area 152 is near the bottom of heater 28, as shown in FIG. 19. See, also, FIG. 18 (ref. no. 152). An auger (not shown) resides inside evaporator area 236 and runs the length of evaporator 50.

Figure 20:
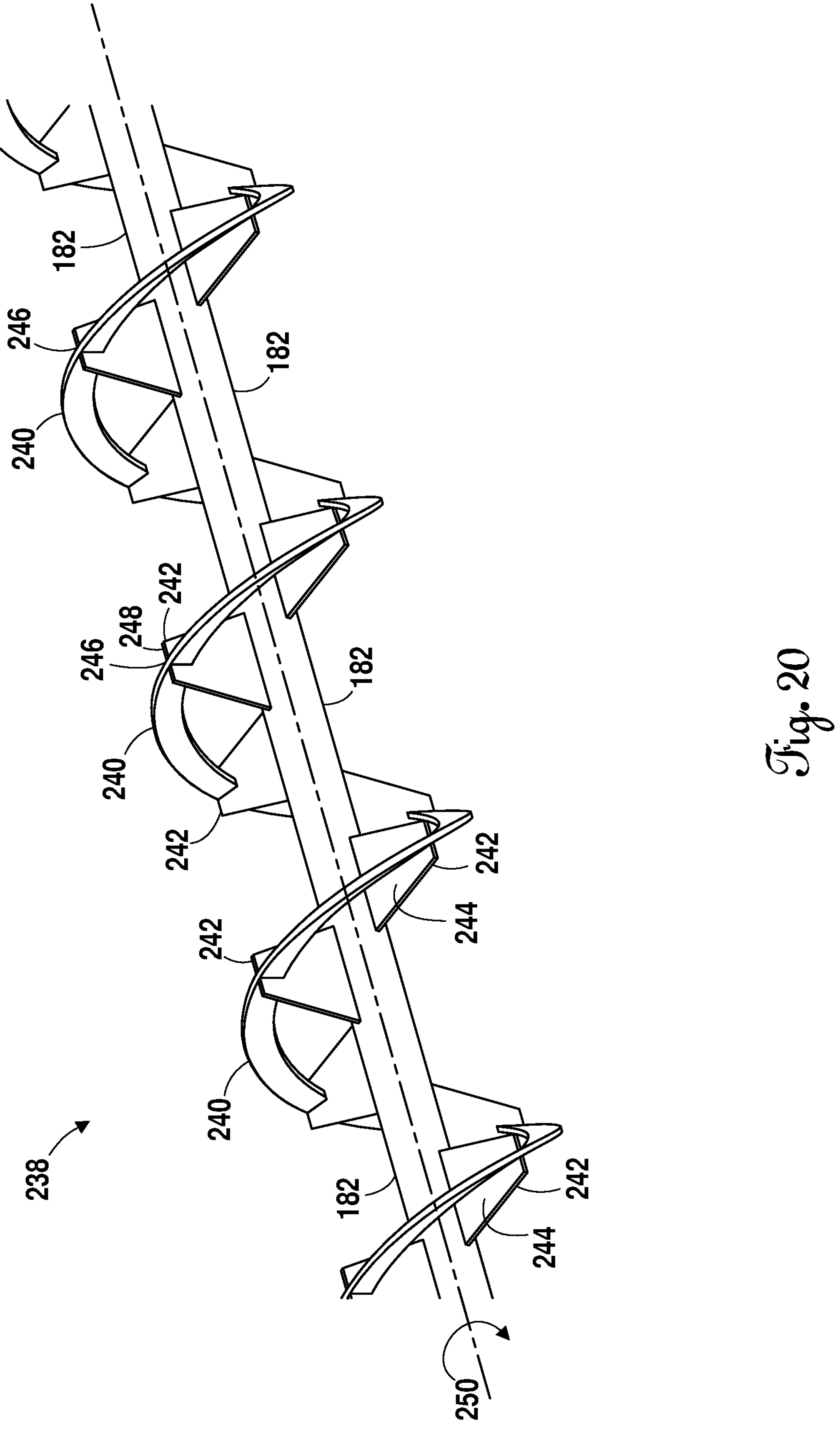
FIG. 20 is a perspective view of the ribbon auger configuration of an embodiment of the present invention.

Turning now to FIG. 20, the unique auger of the present invention combines a ribbon auger 240 with specifically spaced axially mounted stabilizers 242. Stabilizers 242 serve the function of providing rigidity to the auger assembly 238. Stabilizers 242 also provide a mixing function as the flat surface 244 extends towards the inner diameter of the vessel wall (of either heater 18 or evaporators 50, 68). Flat surface 244 of stabilizer 242 is parallel with the axis of rotation 250 of auger 238 and provides a scraping function at the wall of the vessel as auger 238 turns within evaporators 50 or 68. Flat surface 244 may be augmented with a paddle (not shown) to provide frictionless contact with the vessel wall. The paddle may be composed of high-density polyethylene (HDPE), polypropylene (PP) or Teflon or like material. Stabilizers 242 are fused to ribbon auger 240 via a welding operation.

Still referring to FIG. 20, stabilizer 242 is slotted at tip 248 to slide into ribbon auger 240 before welding. The other side of stabilizer 242 that is closer to axis of rotation 250 is welded to auger cylinder or pipe 182. Auger cylinder 182 is threaded (see, e.g., FIG. 15) on both ends for attachment to a shaft (see, e.g., FIG. 19). The shafts on both ends of augers 238 protrude through the seal area of the vessel heads. One end of auger 238 is attached to a gearmotor (as, for example, in evaporator 50) (See FIG. 19) and is affixed radially with a roller bearing (not shown). The shaft on the other end of auger 238 protrudes through the seal area of the vessel head and terminates at the thrust bearing. The radial roller bearing and the thrust roller bearing provide stability to auger 238 in both the radial and thrust directions. Affixing auger 238 in this manner ensures maintenance free operation of evaporators 50 and 68.

Figure 21:
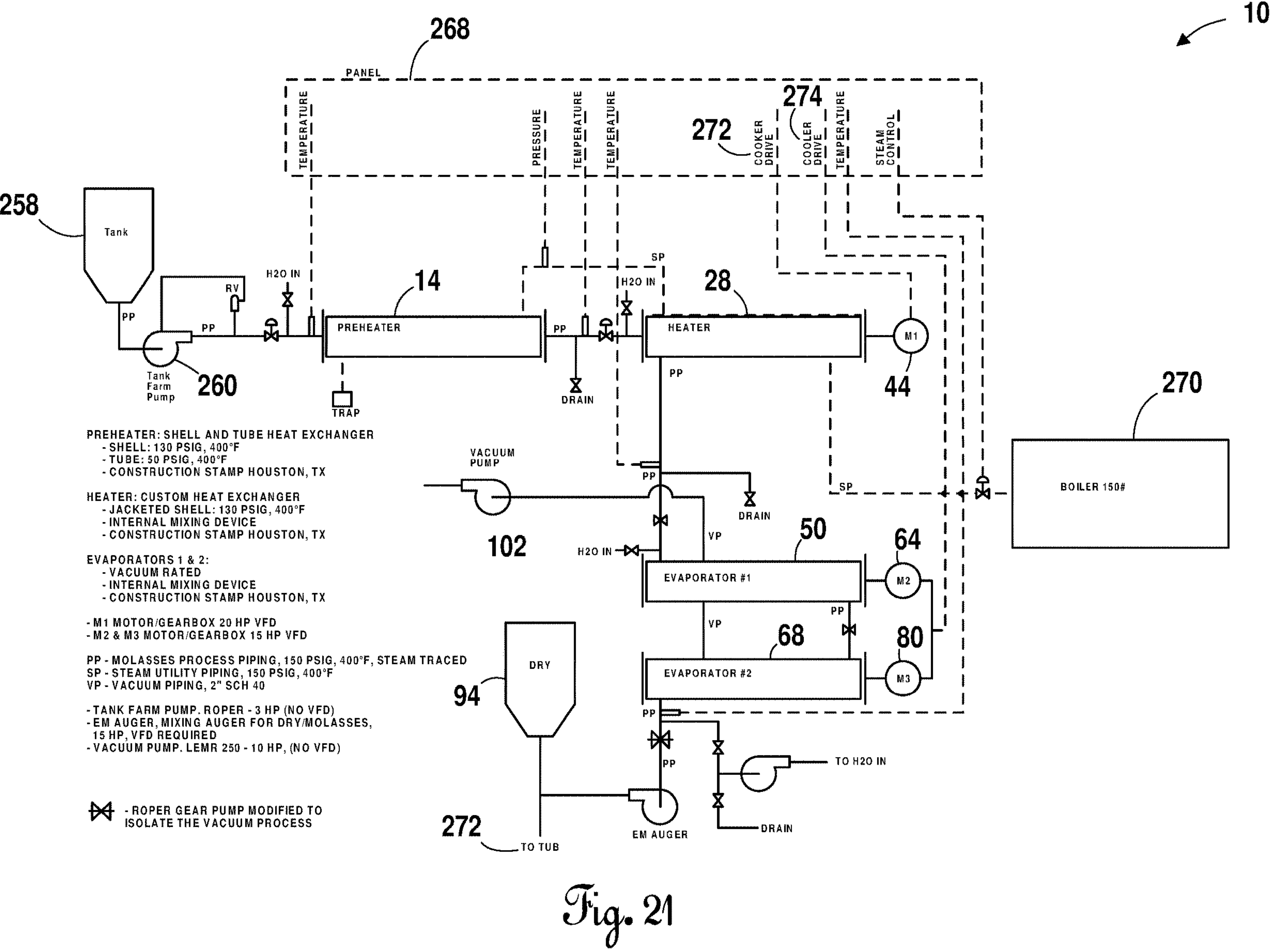
FIG. 21 is a diagram of an embodiment of the present invention.

Referring now to FIG. 21, a schematic illustrates the present invention. Water vapor removal system 10 of the present invention is comprised of several components, including a preheater, heater, a plurality of evaporators, augers, a vacuum pump, and a vacuum isolation device. The first component of water vapor removal system 10 is a shell and tube heat exchanger (STHE) (preheater 14). STHEs transfer heat between two fluids using several tubes inside a larger cylindrical shell. One fluid passed through the plurality of internal tubes (number of tubes may vary). Another fluid passed through the shell over these tubes with heat transfer between the two fluids. In the present invention, the substance from which water vapor is removed passes through the plurality of internal tubes (See, e.g., FIG. 17). Steam passes through the shell over the plurality of tubes. The present invention uses seventeen (17) tubes going back and forth within the larger shell.

The size and number of passes is adjusted from STHE model to model to obtain the ideal evaporation temperature for the next stage of the water vapor removal system 10. Gear pump 260 (may be commercially available) is used to move the substance (i.e., molasses or high sugar concentrate) from storage tank 258 to water vapor removal system 10. Supply pump 260 must be sized to ensure adequate flow through shell and tube heat exchanger preheater 14. If the substance/liquid (not shown) moves too slowly through STHE 14, too much heat will be applied resulting in burning of the sugar. This is undesirable as the sugar requires preservation. If the flow moves too fast through STHE 14, then the heat absorption will be inadequate for the next stage of the process.

The next component and stage of water vapor removal system 10 is cooker or heater 28. Heater 28 is a heated and agitated vessel. The heat is applied by circulating steam through the annulus (or jacket) of heater 28. The steam source (e.g., boiler 270) provides for a more effective heat transfer (as opposed to an open flame gas fired heat source)

as the steam is condensed during the process. The steam source also provides for better temperature control as the set pressure of the steam correlates to a specific steam temperature. For a given flow rate, the molasses temperature exiting the inner chamber of a vessel will be consistent. The temperature and pressure of the steam is adjusted to maximize the heat transfer to the substance circulating inside of cooker or heater 28. Mixing or agitating occurs inside vessel 28 by spinning a customized auger 238 (See FIG. 20). Auger 238 is driven by a gear motor M1 44. Gear motor M1 44 in the present invention is 20 HP VFD. The speed of auger 238 is adjusted through the use of variable frequency drive (VFD) 272 to obtain the ideal substance conditions in preparation for the next component and stage of water vapor removal system 10.

The third stage of water vapor removal system 10 is the utilization of a plurality of evaporation chambers (ECs) or evaporators. The substance (i.e., molasses or high sugar concentrate) will enter evaporation chambers or evaporators 50 and 68 at an elevated and idealized (preprogrammed) temperature. Evaporation chambers or evaporators 50 and 68 are capable of withstanding 0 pounds per square inch absolute (psia) pressures. A vacuum is applied via vacuum pump 102 that produces a vacuum in addition to handling some condensed vapors that occur as the evacuated vapor cools in the process line. Evaporation chambers or evaporators 50 and 68 also contain auger 238 which mixes the sugar substance.

Customized auger 238 is specially designed to maximize the substance surface area thereof. The maximization of the exposed surface area improves the efficacy of the water removal from the substance. The speed of the evaporation auger is adjusted by VFD 274. A gearmotor is used to drive the evaporation auger. More particularly, gear motor M2 64 drives the first evaporator (evaporator 50). Gear Motor M3 80 drives the second evaporator (evaporator 68). Each of gear motors M2 64 and M3 80 are 15 HP VFD. VFD allows for selection of the proper speed of the augers, change of auger speed to improve flow through, and maintenance of the desired vacuum in the system.

The user of the present invention may adjust and control the temperature, pressure and steam of water vapor removal system 10 via control panel 268. For example, and referring still to FIG. 21, control panel 268 may include an emergency stop, machine power, heater agitation, evaporator agitation, temperature control, vacuum control, pressure control, variable frequency drive (VFD), and various other parameters. Flow meters may be used and such may be monitored via control panel 268. A keypad may be incorporated into control panel 268. Conduit carries wiring between components, including sensors and meters, and control panel 268.

A vacuum is typically not used for a water vapor removal system used in similar applications. The reason for not using a vacuum is that it becomes cost prohibitive for most users. The design for vacuum rated vessels requires analysis and engineering. Additionally, the pressure boundary must be designed. The pressure boundary must seal the atmospheric pressure from entering the evaporation chamber. Therefore, the evaporation chamber inlet and outlet both require a pressure seal that maintains vacuum pressure in the evaporation chamber while also allowing the flow of material in and out of the evaporation chamber. This is achieved in a combination of methods. For the inlet, a specially designed adjustable orifice is used to allow the substance to flow into the evaporation chamber. The adjustable annulus will allow for greater flow at increased process rates or lesser flow for lower process rates while maintaining the required vacuum pressure in the evaporation chamber for effective water vapor removal. The outlet must utilize a specially designed piece of equipment most similar to a rotary valve. The rotary valve must be able to transport the evaporated high sugar substance from the evaporation chamber while maintaining the vacuum pressure. This can be difficult as the evaporated high sugar substance will be very viscous and extremely sticky.

A bypass loop will send the process back to the inlet of STHE 14. The bypass loop will eliminate start up waste that is generated while the desired process conditions are being initiated.

Still referring to FIG. 21, a more detailed description of the various components of water vapor removal system 10 of the present invention follows.

STHE Preheater. Shell and tube heat exchanger (STHE) 14 (preheater) utilizes tubes contained within a steam jacket (see, e.g., FIG. 17). This vessel is designed, assembled and manufactured in accordance with the guidelines as set forth in the ASME Boiler and Pressure Vessel Code. This means that the design of shell and tube heat exchanger preheater 14 meets all code requirements and receives a code stamp from the vessel manufacturing facility per the rules as set forth in the ASME Boiler and Pressure Vessel Code.

The design pressure of STHE preheater 12 can range from 50 psi to 250 psi. The design pressures of the tubes are from 0 psia to 50 psi. In essence, a vacuum can be pulled on the tube side of heat exchanger 14 and the design calculation reflect as such.

The path of the molasses or high sugar concentrate substance through STHE 14 is limited to one path. The flow of the high sugar concentrate substance (e.g., molasses) must pass through the length of each tube. For instance, if STHE 14 contains 25 tubes, the flow will pass back and forth through heat exchanger 14 going through every tube. Since molasses has a tendency to plug, STHE preheater 14 utilizes a unique head design. The head system can be made from a single piece or multiple pieces. The head system incorporates the entrance/exit into heat exchanger 14 as well as providing the flow path from the exit of a tube to the entrance of another tube. The current configuration uses a milled head design on each end of heat exchanger 14 to direct the flow of molasses back and forth through heat exchanger 14. The result is a single path through STHE preheater 14.

Manufacturing of this unique head design can only be economically achieved using a five-axis milling machine. Other forms of manufacturing are cost prohibitive as the geometry is difficult to reproduce on conventional equipment.

The length and size of the tubes within STHE 14 are designed for a specific amount of heat transfer when exposed to steam at a specific temperature and pressure. The methods for calculating the heat transfer are verified with empirical data. It is important to achieve a desired temperature through STHE 14 in preparation of the molasses to enter the next vessel.

Heater. Heating vessel 28 is unique. Heating vessel 28 thoroughly and uniformly heats molasses in preparation for the subsequent stage in the process. Heating vessel 28 is jacketed. Steam (not shown) is applied to the jacket area as a source of a heating medium.

Heating vessel 28 is designed, assembled and manufactured in accordance with the guidelines as set forth in the ASME Boiler and Pressure Vessel Code. This means that the design of the jacketed heat exchanger 14 meets all code requirements and receives a code stamp from the vessel manufacturing facility in accordance with the ASME Boiler and Pressure Vessel Code.

The design pressure of the shell of STHE 14 ranges from 50 psi to 250 psi. The inner tube is designed to allow for a vacuum to be pulled on the process side of heat exchanger 14 and the design calculation reflect as such. The inner tube receives the molasses from preheater 14 through the piping of water vapor removal system 10. Once inside heater 28, the mixing device (auger) agitates and mixes the molasses as the molasses passes through heater 28. The length, diameter and thickness are designed to transfer a certain amount of heat. The methods for calculation are confirmed with empirical data.

The mixing device in heater 28 also serves the purpose of transferring the molasses through heater 28. This is achieved by using specially designed auger 238. Auger 238 utilizes blades, ribbon and paddles in a pattern and configuration sufficient to achieve the mixing and transfer of molasses as required. A detailed discussion on auger configuration is given below. Auger 238 is driven by gearmotor M1 44, as shown in FIG. 21. A shaft seal prevents the outside air/pressure from entering the process chamber. Roller ball bearings on each end of the rotor/auger assembly fix the position in the radial and longitudinal directions.

Evaporators. Water vapor removal system 10 utilizes a plurality of evaporation chambers. More particular, two (2) evaporation chambers are used in the present invention. Evaporation chambers or evaporators 50 and 68 expose the process molasses to a vacuum. The vacuum is generated by vacuum pump 102. The vacuum aids in the removal of the water by lowering the boiling point of the water. Mixing and agitation occur in the evaporation vessels (evaporators 50 and 68) through the use of a unique auger. The auger mixes the molasses and transfers the fluid through the length of evaporators 50 and 68.

The evaporators of the present invention are designed, assembled and manufactured in accordance with the guidelines as set forth in the ASME Boiler and Pressure Vessel Code. This means that the design of the evaporators meets all code requirements and receives a code stamp from the vessel manufacturing facility per the rules as set forth in the ASME Boiler and Pressure Vessel Code. The evaporators are full vacuum rated.

The diameter and length are designed to allow for heat transfer (cooling) out of the process fluid (molasses). The heat is transferred from the molasses via conduction (contact) with the evaporator wall. Therefore, the surface area size is of special concern when designing a system to remove a calculated amount of water from the molasses.

The agitation auger turns and mixes the molasses. The auger is specifically designed to maximize the exposure of surface area of the molasses as the molasses (or other high sugar substance) moves through the evaporator. The viscosity of the molasses naturally limits the amount of water vapor emitted from the fluid exposed to a vacuum without agitation. Therefore, any system that attempts to dewater molasses must be effective at mixing/turning/agitating the fluid. This is the only way to effectively remove water from molasses.

Augers. The augers that provide the mixing and agitation in both the heater and the evaporators of the present invention are of a design intended to maximize the surface area exposure of the molasses. Thoroughly mixing the molasses in the process ensures a uniform temperature required at each stage of the process.

The present invention requires a robust seal mechanism at the pressure boundary where the shafts enter the vessels. The shafts are utilized to provide the energy/power to rotate auger 238 while the evaporation occurs in the vessels. The shafts also provide the mechanical stability to the rotating auger while transferring the thrust and radial forces to the bearing assembly.

One end of the rotating assembly is connected to a motor. The shaft on the motor end (called inboard) utilizes a radial bearing assembly. The bearing assembly consists of the radial bearing, the inboard head structure and the inboard seal assembly. The design of this head is robust sufficient to absorb the radial forces as well as the force applied to the seals by the pressure boundary and allows the freedom of rotation. The head design will not fail in fatigue due to the cyclic forces during operation.

The other end of the rotating assembly is connected to the thrust bearing head (called outboard). The outboard head assembly consists of the thrust bearing, the outboard head structure and seal assembly. This thrust bearing will absorb both radial and thrust forces as applied by the rotating assembly. The radial and thrust forces are transmitted to the head while providing freedom of rotation to the auger.

Both the inboard and outboard heads are connected to the vessel by bolting. The head uses geometry similar to a conventional flange as prescribed by the ASME Boiler and Pressure Vessel Code. The heads are modified to accept the additional bearing and seal structures. This head configuration is utilized on both the heater and the evaporator vessels within the present invention.

In one embodiment, insulation may optionally be used to insulate the preheater, heater and evaporators.

Several electrical connections are a part of the invention. However, such electrical connections are such that persons having ordinary skill in the art would possess such knowledge and thus are not expressly detailed herein.

The present invention is comprised of steel. However, other robust material may also be used and remain within the contemplation of the present invention.

The present invention has applications in the agricultural industry, such as in animal feed, e.g., cattle, sheep and horses. The final (moisture evaporated molasses) product made using the system of the present invention is called "tub" (as it is generally collected in a tub). The tub container into which the final product is collected is then covered in a plastic which can then be pulled off and given to animals, such as cattle. Further nutritional or nutraceutical ingredients may be added to the tub product. For example, one can mix 5% of the final tub product with a dry ingredient. The dry ingredient may include nutrients or nutraceuticals, minerals, extra protein, and even pharmaceuticals, e.g., some percentage of a molecule to, for example, control fly population from the animal that consumes the final tub product. As the tub product cools in the tub, sugars in the molasses start to crystalize. This, in turn, makes the final tub product turn from a soft mush consistency to a consistency as hard as a rock. The final hard "rock" tub product, however, remains a liquid but does not flow very fast (akin to glass as a liquid).

The various embodiments described herein may be used singularly or in conjunction with other similar devices. The present disclosure includes preferred or illustrative embodiments of specifically described apparatuses, assemblies, and systems. Alternative embodiments of such apparatuses, assemblies, and systems can be used in carrying out the invention as described herein. Other aspects and advantages of the present invention may be obtained from a study of this disclosure and the drawings.

I claim:

1. A system for removal of water vapor in a high sugar concentrate substance comprising:

a preheater;

a heater in fluid connection with said preheater;

a plurality of evaporator chambers in fluid connection with said heater;

a plurality of augers within said heater and said plurality of evaporator chambers, each auger in said plurality of augers comprising:

a cylinder;

a ribbon auger in a spiral configuration about said cylinder and traversing the length of said cylinder within said heater and said plurality of evaporators chambers;

a plurality of stabilizers axially mounted along the length of said cylinder and spaced at a predetermined distance therebetween and attached to said ribbon auger; and a close clearance vacuum isolation device in fluid connection with said heater and said plurality of evaporator chambers, said close clearance vacuum isolation device providing and maintaining internal vacuum pressure isolation of each of said preheater, said heater, and said plurality of evaporator chambers while simultaneously passing said high sugar concentrate substance in a continuous flow into and out of said preheater, said heater, and said plurality of evaporator chambers;

wherein said close clearance vacuum device comprises two teethed rotating components within a housing, including a driven rotor and a driving rotor, wherein both rotating components are fixed on both axial ends by ball bearings mounted in the housing and wherein the teeth of the driven rotor engage with the teeth of the driving rotor such that the rotating components spin together at the same rotational speed, but in opposite directions; and wherein said high sugar concentrate substance has a moisture content of up to 40% by weight.

2. The system for removal of water vapor in a high sugar concentrate substance comprising, as recited in claim 1, wherein each stabilizer has a slotted tip to accommodate a portion of said ribbon auger and extends distally from said cylinder toward the inner diameter of said heater and said plurality of evaporators chambers.

3. A method of operating the system for removal of water vapor in a high sugar concentrate substance according to claim 1, said method comprising the steps of:

initiating said system with a set of predetermined instructions;

introducing a sample of high sugar concentrate substance to said preheater; wherein said high sugar concentrate substance has a moisture content of up to 40% by weight;

heating said sample of high sugar concentrate substance to a predetermined temperature and for a predetermined consistency;

first moving said sample of high sugar concentrate substance to a first evaporation chamber;

second moving said sample of high sugar concentrate substance to a second evaporation chamber;

applying a continuous flow vacuum pressure to said first and second evaporation chambers; and monitoring the moisture content of said sample of high sugar concentrate substance; wherein a final product has a moisture content of 5% by weight or less.

4. The method of operating a system for removal of water vapor in a high sugar concentrate substance, as recited in claim 3, wherein said preheater is a shell and tube heat exchanger.

5. The method of operating a system for removal of water vapor in a high sugar concentrate substance, as recited in claim 4, wherein said set of predetermined instructions include parameters for temperature and pressure.

6. The method of operating a system for removal of water vapor in a high sugar concentrate substance, as recited in claim 5, wherein said heating step is further comprised of applying steam via a steam jacket.

* * * * *